US012542992B2

(12) United States Patent
Stoerger

(10) Patent No.: US 12,542,992 B2
(45) **Date of Patent: *Feb. 3, 2026**

(54) NOISE CANCELLING SOUNDBAR DEVICE AND SYSTEM

(71) Applicant: Richard Stoerger, New Rochelle, NY (US)

(72) Inventor: Richard Stoerger, New Rochelle, NY (US)

( * ) Notice: Subject to any disclaimer, the term of this patent is extended or adjusted under 35 U.S.C. 154(b) by 155 days.

This patent is subject to a terminal disclaimer.

(21) Appl. No.: 18/410,983

(22) Filed: Jan. 11, 2024

(65) Prior Publication Data

US 2024/0155282 A1 May 9, 2024

Related U.S. Application Data

(63) Continuation-in-part of application No. 17/658,414, filed on Apr. 7, 2022, now Pat. No. 12,020,678, which is a continuation-in-part of application No. 17/088,008, filed on Nov. 3, 2020, now Pat. No. 11,330,369.

(60) Provisional application No. 62/930,445, filed on Nov. 4, 2019.

(51) Int. Cl.
*H04R 1/10* (2006.01)
*H04R 1/02* (2006.01)

(52) U.S. Cl.
CPC .......... *H04R 1/1083* (2013.01); *H04R 1/026* (2013.01); *H04R 2201/021* (2013.01); *H04R 2420/07* (2013.01)

(58) Field of Classification Search
CPC .................. H04R 1/1083; H04R 1/026; H04R 2201/021; H04R 2420/07
See application file for complete search history.

(56) References Cited

U.S. PATENT DOCUMENTS

| | | | | |
|---|---|---|---|---|
| 10,515,619 | B1 * | 12/2019 | Chang | A47G 9/10 |
| 11,330,369 | B2 * | 5/2022 | Stoerger | H04R 3/02 |
| 12,020,678 | B2 * | 6/2024 | Stoerger | H04S 7/301 |
| 2017/0053637 | A1 * | 2/2017 | DeFranks | A47G 9/1045 |

* cited by examiner

*Primary Examiner* — Andrew Sniezek

(74) *Attorney, Agent, or Firm* — Kevin Schraven; Anooj Patel; Hankin Patent Law, APC

(57) ABSTRACT

A noise cancelling speaker system that may include one or more noise cancelling speakers. The speakers may or may not include a lighting fixture. The speaker system may be mounted to or integrated into the floor or a tabletop fixture (i.e., table lamp). Alternatively, the speaker system may be suspended or built into a ceiling or support or mounted to a wall or other furniture (ceiling lamp). The system may be designed to cancel out noise, play music, or play announcements. In system may also provide lighting. The system may be in communication with external microphones and may be controlled using a control interface, such as a remote control.

15 Claims, 31 Drawing Sheets

NOISE CANCELLING SOUNDBAR DEVICE AND SYSTEM

CROSS-REFERENCE TO RELATED APPLICATIONS

This Application is a Continuation-in-Part of U.S. Non-Provisional patent application Ser. No. 17/658,414, titled Noise Cancelling Soundbar Device and System, filed on Apr. 7, 2022, now U.S. Pat. No. 12,020,678, the contents of which are expressly incorporated herein by this reference as though set forth in their entirety, and to which priority is claimed. U.S. patent application Ser. No. 17/658,414 is a Continuation-in-Part of U.S. patent application Ser. No. 17/088,008, filed on Nov. 3, 2020, now U.S. Pat. No. 11,330,369, the contents of which are expressly incorporated herein by this reference as though set forth in their entirety, and to which priority is claimed. U.S. Non-Provisional patent application Ser. No. 17/088,008 claims the benefit of U.S. Provisional Patent Application No. 62/930,445, filed on Nov. 4, 2019, the contents of which are expressly incorporated herein by this reference as though set forth in their entirety, and to which priority is claimed.

FIELD OF USE

The present disclosure relates generally to devices, systems, and methods for electronic loudspeakers, and more specifically to a noise cancelling loudspeaker system that creates semi-soundproof zones for its nearby users without requiring the use of headphones or expensive soundproofing insulation. This noise cancelling speaker device and system also enhances the playing of music by reducing background noise and artifacts created during the process of making sound.

BACKGROUND

Loudspeakers are used in all types of applications. They are used for public address systems, background music, foreground music in all types of environments and spaces. They are used to project announcements as well as entertainment. In restaurants and bars, the use of loudspeakers for music is commonplace.

Unfortunately, noise is everywhere and often encumbers a person's ability to hear others or to be heard when in conversation. This is prevalent in dining establishments among other places, where noise generated by other diners, people mingling at the bar, kitchen noise and the bustling sounds created by the wait staff, to name a few, making conversation difficult or impossible. One has to strain to hear and to be heard making for a less than desirable dining experience. Additionally, speakers used in dining establishments often sound distorted adding to the din rather than helping to solve a problem. In the end patrons find it hard to be heard by the person sitting across the table.

Often there is no way to improve this situation of unwanted background noise. Proper soundproofing of the space can help in this matter as well as spacing the tables or setting up partitions in addition to providing distance between the dining space and crowded areas such as the bar.

Because the cost of space is at a premium, and the cost of installing soundproofing materials is very high, there is nothing within reason that can be done to improve the noise level at a dining table.

This same problem extends to other spaces and environments. There can be too much background noise in homes, offices, schools, places of worship, and any other gathering place.

Frequently, the goal is not to eliminate the background noise entirely, it is simply to reduce the level of background noise so that conversations can take place without having to speak loudly or strain one's voice and constantly having to focus one's hearing and attention to the speaker.

Thus, what is needed is a convenient, comfortable, and affordable way for users to comfortably engage with each other without having to shout or move so close as to be inconvenienced, and without having to wear headphones/microphones (which is what is used to enable communication in small noisy aircraft, like a helicopter) in noisy spaces just to be able to speak with each other. What is required is a system that reduces the effects of background noise and, if desired, enhances the space with sound (such as music) and light.

SUMMARY

To minimize the limitations in the cited references, and to minimize other limitations that will become apparent upon reading and understanding the present specification, the present specification discloses a new noise cancelling sound device and system that is ideal for dining establishments but also suitable for other uses were the lowering of the background noise level is desired, be it from the speaker playing music, the ambient noise generated in the space, or both.

In one embodiment, the noise cancelling speaker system of the present disclosure may comprise a loudspeaker, an integrated power amplifier, an audio input communication module, internal or external microphones and a lighting fixture (optional). The noise cancelling speaker may combine multiple audio-related technologies into a form factor specifically optimized for use in bars and restaurants. This can involve either completely independent self-contained devices, centrally connected devices (wired or wirelessly), or a hybrid of self-contained devices that connect to a centralized system for content (music) and noise data (microphones used to measure sound {noise} closer to the noise source).

In one embodiment, the noise cancelling speaker may comprise one or more loudspeakers, an integrated power amplifier, an audio input communication module, a light module of some sort (optional), and lamp like base. The noise cancelling speaker may be configured to receive an audio signal input from a media source, such as a TV, smartphone, central music system or other device, and play the audio signal from the one or more loudspeakers. The lamp fixture (optional) can provide light. In one embodiment, the one or more loudspeakers may preferably be adjustable via an actuator, which allows the one or more loudspeakers to be rotated or pivoted to precisely aim the audio output of the noise cancelling speaker. By carefully positioning the noise cancelling speaker and the one or more loudspeakers, it is possible to focus the beneficial noise cancelling affect to listening area as well as direct sound (music) and light to that space such as a dining room table.

For example, it is not uncommon to include table lamps or hanging lamps in restaurants and bars. It is also common to have speakers mounted in the same space for music. The noise cancelling speaker can combine both lighting and sound in one enclosure, while at the same time directing noise cancelling sound waves to areas and spaces.

One embodiment may be a noise cancelling speaker system in the form of a mounted enclosure, comprising just a noise cancelling speaker that is hung over a table or bar. In another embodiment, that same enclosure may include a lighting fixture. These noise cancelling speakers can also be mounted to the ceiling or a structure above the table. They can even be built into a surface so that they appear to be recessed, which may include cosmetic variations that make them nearly invisible to the eye.

One or more microphones may be used to measure nearby ambient noise. The measured ambient noise may then be processed by the active noise cancellation module, such that a negative sound output pattern is generated. In one embodiment, any ambient noise in the vicinity of the noise cancelling loudspeaker may be measured by the one or more microphones. The noise cancellation module may then communicate with the one or more microphones to obtain accurate ambient noise data. The noise cancelling speaker may then process the ambient noise data with an active noise cancellation module, to produce a negative sound output pattern that is specifically designed to cancel out the ambient noise emanating from the vicinity of the microphones. The one or more loudspeakers of the noise cancelling speaker may then play the negative sound output pattern, such that the negative sound output pattern destructively interferes with the sound waves of the ambient (background) noise. In this manner, the noise cancelling speaker may insulate a user from the ambient noise in the vicinity of the microphone/s.

The noise cancelling speaker may use the corresponding microphones, active noise cancelling module(s), and loudspeakers to similarly insulate a user from ambient noise while listening to a media from either a centralized audio system or from a personal device (such as a mobile device playing music via Bluetooth).

Each noise cancelling speaker may preferably be positioned near a listener's head/ears, reducing the level of sound required for the user to hear the loudspeaker output audio. Suitable locations for placing a noise cancelling speaker may include, but is not limited to, bar areas, dining room tables, offices, libraries, home offices, working spaces, bedrooms, and play areas.

One embodiment may be a noise cancelling speaker, comprising: one or more loudspeakers, an integrated power amplifier, an audio input communication module, one or more microphones, and an active noise cancelling module; wherein the one or more microphones may be configured to measure ambient noise; wherein the active noise cancelling module may be configured to process the ambient noise, to create a negative output that may be configured to destructively interfere with the ambient noise; wherein the negative output audio may be configured to be emitted from the one or more loudspeakers, such that the ambient noise may be substantially cancelled or reduced, and; wherein the noise cancelling speaker may be configured to receive an audio signal from one or more media sources and subsequently play the audio signal from the one or more loudspeakers. In another embodiment, the noise cancelling speaker may further comprise one or more adjustable bases and one or more actuators; wherein the one or more loudspeakers may be mounted on the one or more adjustable bases; wherein the one or more actuators may be configured to adjust the one or more adjustable bases. The noise cancelling speaker may be installed in any environment with sufficient space, including, but not limited to, the dining space. Preferably, the one or more adjustable bases may be configured to direct the audio output signal from the one or more loudspeakers to a listener by the bar or in a booth.

One embodiment may be a noise cancelling speaker system, comprising: a first noise cancelling speaker and a second noise cancelling speaker, wherein the first and second noise cancelling speakers may each individually comprise, respectively: a first/second set of one or more loudspeakers; a first/second audio input communication module; at least one first/second ambient microphone; at least one first/second near field microphone, and a first/second active noise cancellation module. In a preferred embodiment, the first noise cancelling speaker and the second noise cancelling speaker may be configured to offset each other. At least one first ambient microphone and the at least one second ambient microphone are on different noise canceling speakers. The at least one first near field microphone and the at least one second near field microphone may be proximate to the noise cancelling speaker, and be configured to, respectively, measure a first and second near field noises coming from another table, wherein the at least one ambient microphone and the at least one second ambient microphone may be configured to, respectively, measure a first ambient noise and a second ambient noise. The first and second ambient noise cancelling modules may be configured to process the first and second ambient noises, such that a first and a second negative output audios are created, which may be configured to destructively interfere, relatively, with the first and second ambient noises. Similarly, the first and second active cancelling modules may be configured to process the first and second near field noises, such that a first and second negative output audios are created that may be configured to destructively interfere, relatively, with the first and second near field noises. Alternatively, the first and second active noise cancelling modules may be configured to process, respectively, both the first and second near field noises and the first and second ambient noises, such that a first and second negative output audios may be created that may be configured to destructively interfere, relatively, with both the first and second near field noises and the first and second ambient noises.

Regarding the cancellation of ambient audio: the first and second negative output audios may be configured to be respectively emitted from the first and second sets of one or more loudspeakers, such that the first and second ambient noises may be substantially cancelled or reduced. Regarding the cancellation of near field audio: the first and second negative output audios may be configured to be respectively emitted from the first and second sets of one or more loudspeakers, such that the first and second near field noises may be substantially cancelled or reduced. In some instances, the ambient and near field audio may both be substantially cancelled or reduced, wherein the first and second negative output audios may be configured to be respectively emitted from the first and second sets of one or more loudspeakers, such that both the first and second near field noises, and the first and second ambient noises may be substantially cancelled or reduced.

Preferably, the first and second noise cancelling speakers may be configured to receive an audio signal from one or more media sources and subsequently play the audio signal from the first and second sets of one or more loudspeakers; wherein the first noise cancelling speaker may comprise a first set of one or more adjustable bases and a first set of one or more actuators; wherein the second noise cancelling speaker may comprise a second set of one or more adjustable bases and a second set of one or more actuators; wherein the first set of one or more loudspeakers may be mounted on the first set of one or more adjustable bases; wherein the first set of one or more actuators may be configured to adjust the first set of one or more adjustable bases; wherein the second set of one or more loudspeakers may be mounted on the second set of one or more adjustable bases; and wherein the second set of one or more actuators may be configured to adjust the second set of one or more adjustable bases.

One embodiment may be a noise cancelling system, comprising: a first noise cancelling speaker; wherein the first noise cancelling speaker comprises: at least one first loudspeaker; at least one first microphone, which may be configured to sense and measure a first ambient noise; and a first active noise cancelling module, which may be configured to be in communication with the at least one first loudspeaker and the at least one first microphone; wherein the first active noise cancelling module may process the first ambient noise to create a first negative output audio; wherein the first negative output audio may be configured to be projected from the at least one first loudspeaker; and wherein the first negative output audio, when projected from the at least one first loudspeaker, destructively interferes with the first ambient noise; a second noise cancelling speaker; wherein the second noise cancelling speaker comprises: at least one second loudspeaker; at least one second microphone, which may be configured to sense and measure a second ambient noise; and a second active noise cancelling module, which may be configured to be in communication with the at least one second loudspeaker and the at least one second microphone; wherein the second active noise cancelling module may process the second ambient noise to create a second negative output audio; wherein the second negative output audio may be configured to be projected from the at least one second loudspeaker; and wherein the second negative output audio, when projected from the at least one second loudspeaker, destructively interferes with the second ambient noise; wherein the first and second noise cancelling speaker are configured to be in communication with each other, such that they work together to destructively interfere with the first and second ambient noises. In some embodiments, the first and second noise cancelling speakers may be physically connected to each other. In others, they may communicate or otherwise be connected by a wire connection or a wireless connection. The first and second noise cancelling speakers may be configured to be engaged to or in the structures selected from the group of structures consisting of one or more of: a mounted lamp like enclosure, a table lamp enclosure, or a floor lamp enclosure. The first noise cancelling speaker may further comprise: at least one first adjustable loudspeaker base and at least one first adjustable microphone base; wherein the at least one first loudspeaker may be mounted on the at least one first adjustable loudspeaker base; wherein the at least one first microphone may be mounted on the at least one first adjustable microphone base; wherein the at least one first adjustable loudspeaker base may be configured to be adjustable so as to adjust an angle of the at least one first loudspeaker, thereby adjusting the first negative output audio, such that the first negative output audio may be configured to destructively interfere with the first ambient noise; and wherein the at least one first adjustable microphone base may be configured to adjust an angle of the at least one first microphone to improve sensing and measuring of the first ambient noise. The second noise cancelling speaker may further comprise: at least one second adjustable loudspeaker base; and at least one second adjustable microphone base; wherein the at least one second loudspeaker may be mounted on the at least one second adjustable loudspeaker base; wherein the at least one second microphone may be mounted on the at least one second adjustable microphone base; wherein the at least one second adjustable loudspeaker base may be configured to be adjustable so as to adjust an angle of the at least one second loudspeaker, thereby adjusting the second negative output audio, such that the second negative output audio may be configured to destructively interfere with the second ambient noise; and wherein the at least one second adjustable microphone base may be configured to adjust an angle of the at least one second microphone to improve sensing and measuring of the second ambient noise. The first ambient noise experienced by a user may be substantially reduced when the first ambient noise is destructively interfered with by the first negative audio output; and wherein the second ambient noise experienced by a second user may be substantially reduced when the second ambient noise is destructively interfered with by the second negative audio output. The first and second noise cancelling speaker may be configured to receive an audio signal from one or more media sources and subsequently play the audio signal from the first and second loudspeakers. The first and second ambient noises may be substantially the same. The first and second noise cancelling speaker may be configured to be controlled by a control interface, such as a remote-control device. The noise cancelling system may further comprise at least one external microphone, which may be configured to sense and measure an external ambient noise; wherein the at least one external microphone may be configured to be in communication with first active noise cancelling module; wherein the first active noise cancelling module may process the external ambient noise to create an external negative output audio; wherein the external negative output audio may be configured to be projected from the at least one first loudspeaker; and wherein the external negative output audio, when projected from the at least one first loudspeaker, destructively interferes with the external ambient noise. The at least one first noise cancelling speaker may be configured to be in communication with at least one external microphone, which may be configured to sense and measure an external ambient noise; wherein the at least one external microphone may be configured to be in communication with first active noise cancelling module; wherein the first active noise cancelling module may process the external ambient noise to create an external negative output audio; wherein the external negative output audio may be configured to be projected from the at least one first loudspeaker; and wherein the external negative output audio, when projected from the at least one first loudspeaker, destructively interferes with the external ambient noise.

Another embodiment may be a noise cancelling system, comprising: a first noise cancelling speaker; wherein the first noise cancelling speaker comprises: at least one first loudspeaker; at least one first microphone, which may be configured to sense and measure a first ambient noise; and a first active noise cancelling module, which may be configured to be in communication with the at least one first loudspeaker and the at least one first microphone; wherein the first active noise cancelling module processes the first ambient noise to create a first negative output audio; wherein the first negative output audio may be configured to be projected from the at least one first loudspeaker; and wherein the first negative output audio, when projected from the at least one first loudspeaker, destructively interferes with the first ambient noise; a noise cancelling speaker slave device; wherein the noise cancelling speaker slave device comprises: at least one slave loudspeaker, which may be configured to be in communication with the first active noise cancelling module; and at least one slave microphone, which may be configured to be in communication with the first active noise cancelling module, and which may be configured to sense and measure a slave ambient noise; wherein the first active noise cancelling module processes the slave ambient noise to create a slave negative output audio; wherein the second negative output audio may be configured to be projected from the at least one slave loudspeaker; and wherein the slave negative output audio, when projected from the at least one slave loudspeaker, destructively interferes with the slave ambient noise; and wherein the noise cancelling speaker slave device may be configured to be in communication with the first noise cancelling speaker, such that they work together to destructively interfere with the first and slave ambient noises. The first noise cancelling speaker may be physically connected to the noise cancelling speaker slave device or it may be separate and connected via wire or wirelessly. The first noise cancelling speaker and the noise cancelling speaker slave device may be configured to be engaged to or in the structures selected from the group of structures consisting of one or more of: a wall; a headboard; and combinations thereof. The first noise cancelling speaker may further comprise: at least one first adjustable loudspeaker base; and at least one first adjustable microphone base; wherein the at least one first loudspeaker may be mounted on the at least one first adjustable loudspeaker base; wherein the at least one first microphone may be mounted on the at least one first adjustable microphone base; wherein the at least one first adjustable loudspeaker base may be configured to be adjustable so as to adjust an angle of the at least one first loudspeaker, thereby adjusting the first negative output audio, such that the first negative output audio is configured to destructively interfere with the first ambient noise; and wherein the at least one first adjustable microphone base may be configured to adjust an angle of the at least one first microphone to improve or accomplish sensing and measuring of the first ambient noise. The noise cancelling speaker slave device may further comprise: at least one slave adjustable loudspeaker base; and at least one slave adjustable microphone base; wherein the at least one slave loudspeaker may be mounted on the at least one slave adjustable loudspeaker base; wherein the at least one slave microphone may be mounted on the at least one slave adjustable microphone base; wherein the at least one slave adjustable loudspeaker base may be configured to be adjustable so as to adjust an angle of the at least one slave loudspeaker, thereby adjusting the slave negative output audio, such that the slave negative output audio is configured to destructively interfere with the slave ambient noise; and wherein the at least one slave adjustable microphone base may be configured to adjust an angle of the at least one slave microphone to improve sensing and measuring of the slave ambient noise. The first ambient noise experienced by a user is substantially reduced when the first ambient noise is destructively interfered with by the first negative audio output; and wherein the slave ambient noise experienced by a second user is substantially reduced when the slave ambient noise is destructively interfered with by the slave negative audio output. The first noise cancelling speaker may be configured to receive an audio signal from one or more media sources and subsequently play the audio signal from the at least one first loudspeaker and the at least one slave loudspeaker. Sometimes, the first and slave ambient noises may be substantially the same. The first noise cancelling speaker and the noise canceling speaker slave device may be configured to be controlled by a control interface. The noise cancelling system may further comprise at least one external microphone, which may be configured to sense and measure an external ambient noise; wherein the at least one external microphone may be configured to be in communication with the first active noise cancelling module; wherein the first active noise cancelling module processes the external ambient noise to create an external negative output audio; wherein the external negative output audio may be configured to be projected from the at least one first loudspeaker; and wherein the external negative output audio, when projected from the at least one first loudspeaker, destructively interferes with the external ambient noise. Rather than being part of the system, the remote/external microphone can be an external system that is connected to the present system. Specifically, the at least one first noise controlling speaker may be configured to be in communication with at least one external microphone, which may be configured to sense and measure an external ambient noise; wherein the at least one external microphone may be configured to be in communication with first active noise cancelling module; wherein the first active noise cancelling module processes the external ambient noise to create an external negative output audio; wherein the external negative output audio may be configured to be projected from the at least one first loudspeaker; and wherein the external negative output audio, when projected from the at least one first loudspeaker, destructively interferes with the external ambient noise.

Another embodiment may be a noise cancelling system, comprising: a noise cancelling speaker; wherein the noise cancelling speaker comprises: at least one first loudspeaker; at least one first microphone, which may be configured to sense and measure a first ambient noise; a first active noise cancelling module, which may be configured to be in communication with the at least one first loudspeaker and the at least one first microphone; at least one first adjustable loudspeaker base; and at least one first adjustable microphone base; wherein the first active noise cancelling module processes the first ambient noise to create a first negative output audio, and a battery to provide power to the system which may or may not be rechargeable; wherein the first negative output audio may be configured to be projected from the at least one first loudspeaker; and wherein the first negative output audio, when projected from the at least one first loudspeaker, destructively interferes with the first ambient noise; wherein the first noise cancelling speaker may be configured to be engaged to or in the structures selected from the group of structures consisting of one or more of a speaker enclosure mounted to a structure, speaker enclosure mounted on a base that sits on a table, mounted on a base that sits on the floor; wherein the at least one first loudspeaker may be mounted on the at least one first adjustable loudspeaker base; wherein the at least one first microphone may be mounted on the at least one first adjustable microphone base; wherein the at least one first adjustable loudspeaker base may be configured to be adjustable so as to adjust an angle of the at least one first loudspeaker, thereby adjusting the first negative output audio, such that the first negative output audio is configured to destructively interfere with the first ambient noise; and wherein the at least one first adjustable microphone base may be configured to adjust an angle of the at least one first microphone to improve sensing and measuring of the first ambient noise. The first ambient noise experienced by a user is substantially reduced when the first ambient noise is destructively interfered with by the first negative audio output. The first noise cancelling speaker may be configured to receive an audio signal from one or more media sources and subsequently play the audio signal from the first loudspeaker. The first noise cancelling speaker may be configured to be controlled by a control interface. The noise cancelling system may further comprise at least one external microphone, which may be configured to sense and measure an external ambient noise; wherein the at least one external microphone may be configured to be in communication with first active noise cancelling module; wherein the first active noise cancelling module processes the external ambient noise to create an external negative output audio; wherein the external negative output audio may be configured to be projected from the at least one first loudspeaker; and wherein the external negative output audio, when projected from the at least one first loudspeaker, destructively interferes with the external ambient noise. Alternatively, the at least one first noise cancelling speaker may be configured to be in communication with at least one external microphone, which may be configured to sense and measure an external ambient noise; wherein the at least one external microphone may be configured to be in communication with first active noise cancelling module; wherein the first active noise cancelling module processes the external ambient noise to create an external negative output audio; wherein the external negative output audio may be configured to be projected from the at least one first loudspeaker; and wherein the external negative output audio, when projected from the at least one first loudspeaker, destructively interferes with the external ambient noise.

By extending the above methodology to multiple noise cancelling speakers (e.g., three or more), it will be apparent that the devices, systems, and methods of the present disclosure may be modified to include larger numbers of speakers used in tandem, to create an interconnected network of semi-soundproof listening zones, one for each noise cancelling speakers in the network.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps, which are illustrated. When the same numeral appears in different drawings, it refers to the same or like components or steps.

DETAILED DESCRIPTION OF THE ILLUSTRATIVE EMBODIMENTS

Figure 1A:
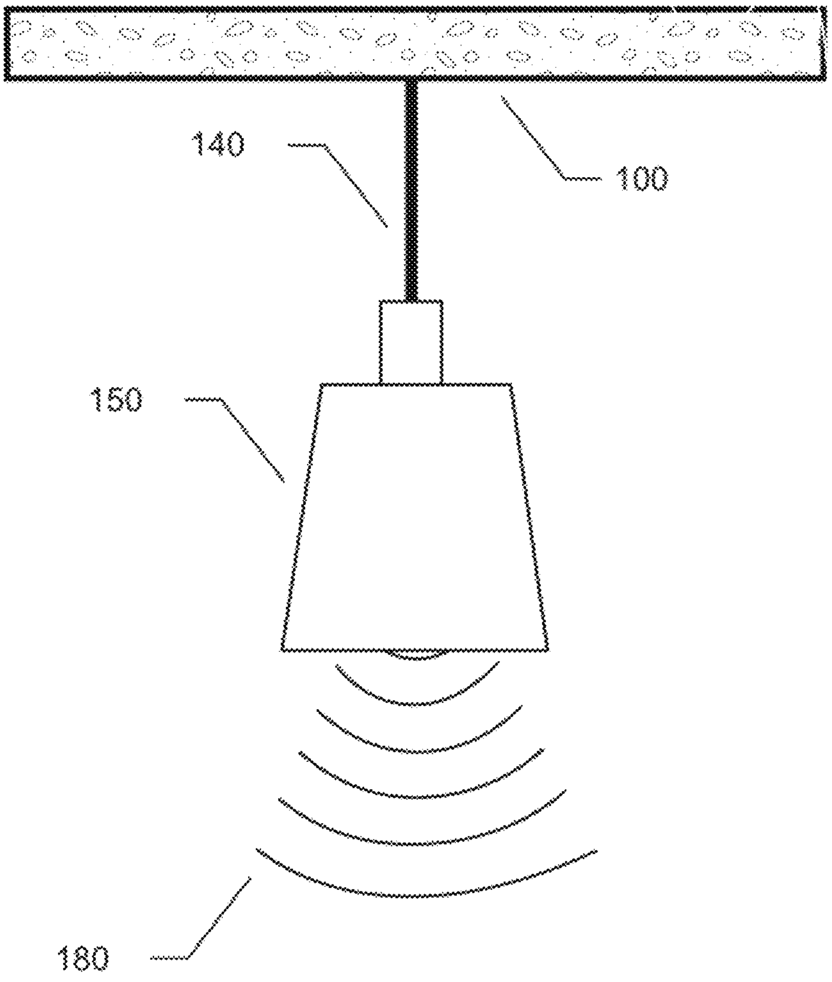
FIG. 1A-1D are illustrations of four embodiments of a noise cancelling speaker that are installed on a structure, such as a wall or ceiling.
Figure 1B:
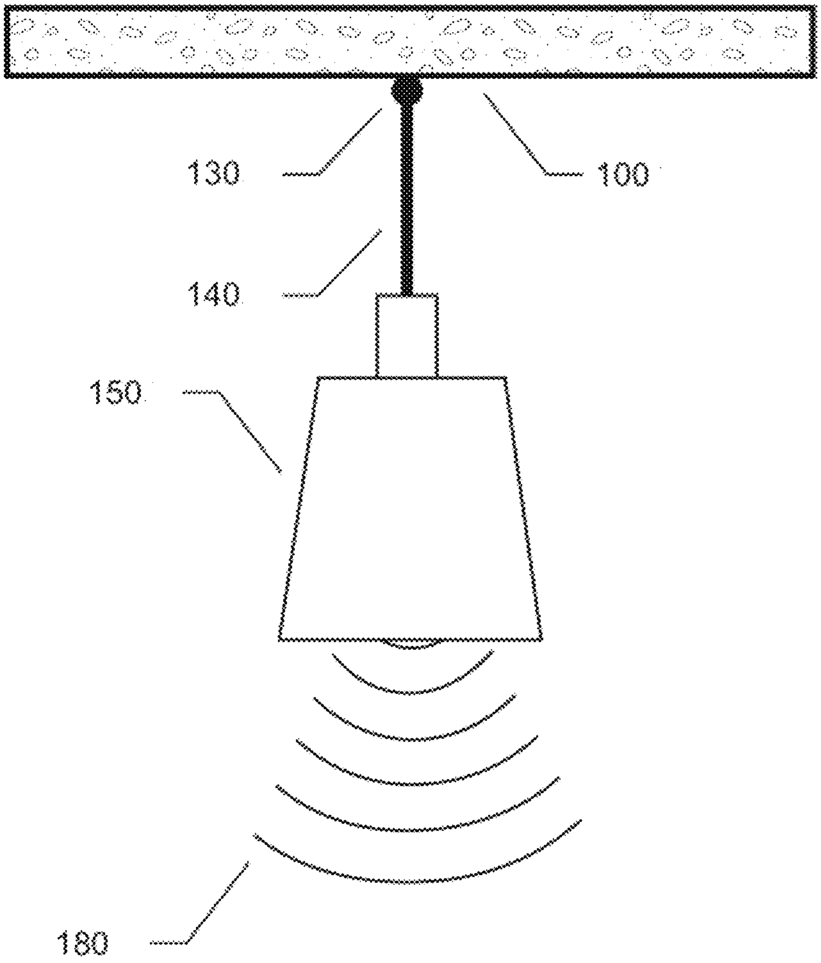
Figure 1C:
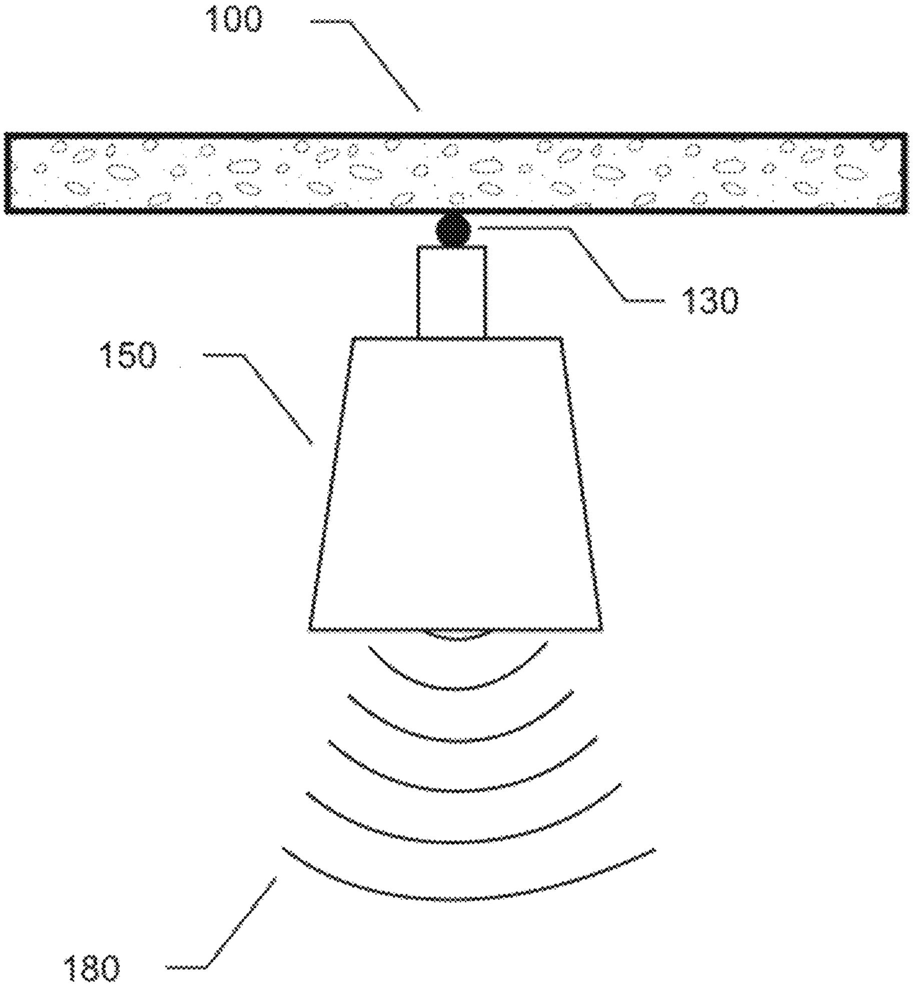
Figure 1D:
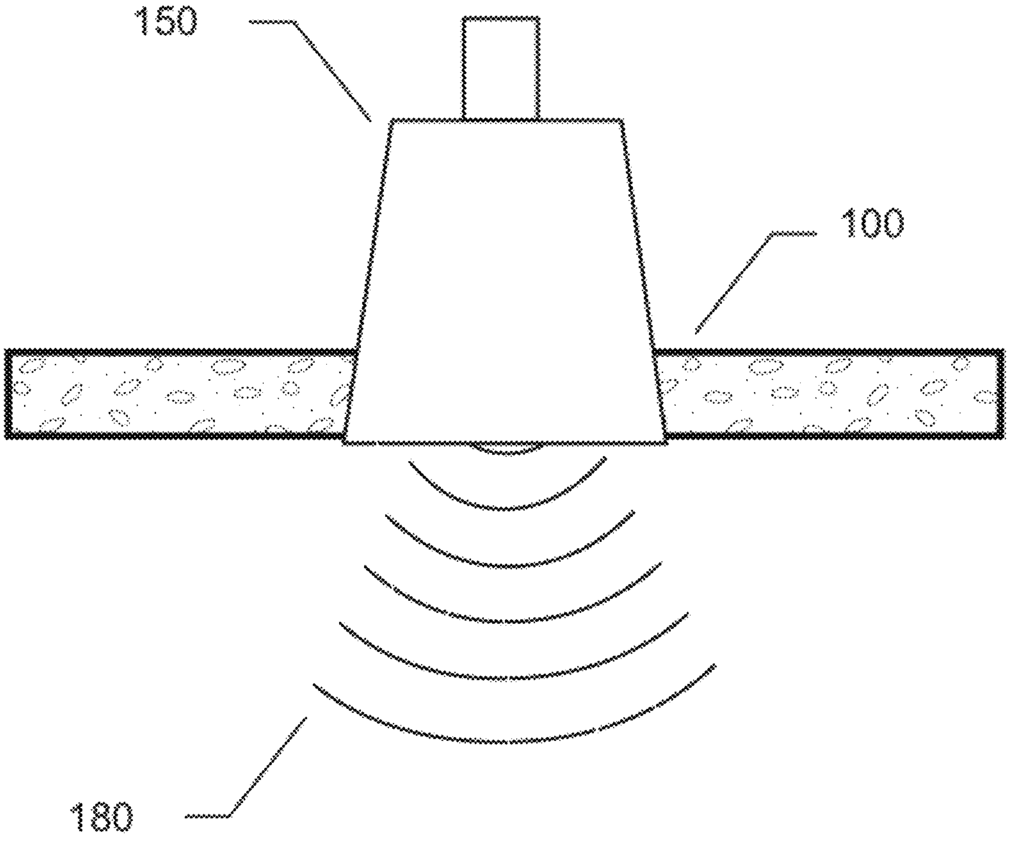
Figure 2A:
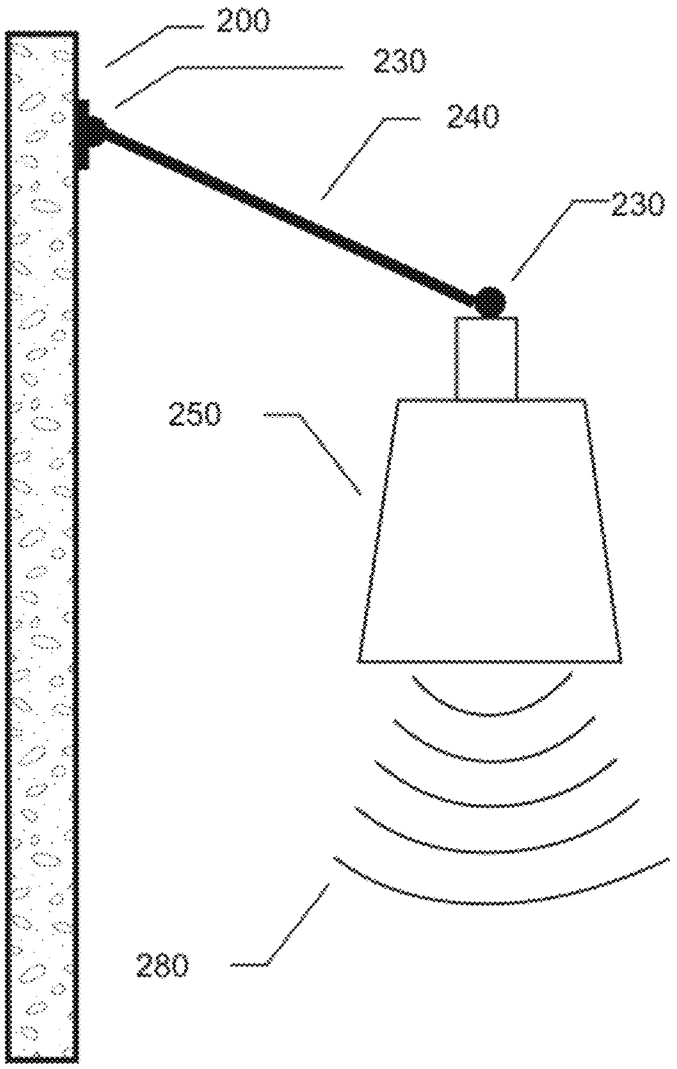
FIG. 2A-2D are illustrations of four other embodiments of a noise cancelling speaker that are installed on a structure, such as a wall or ceiling.
Figure 2B:
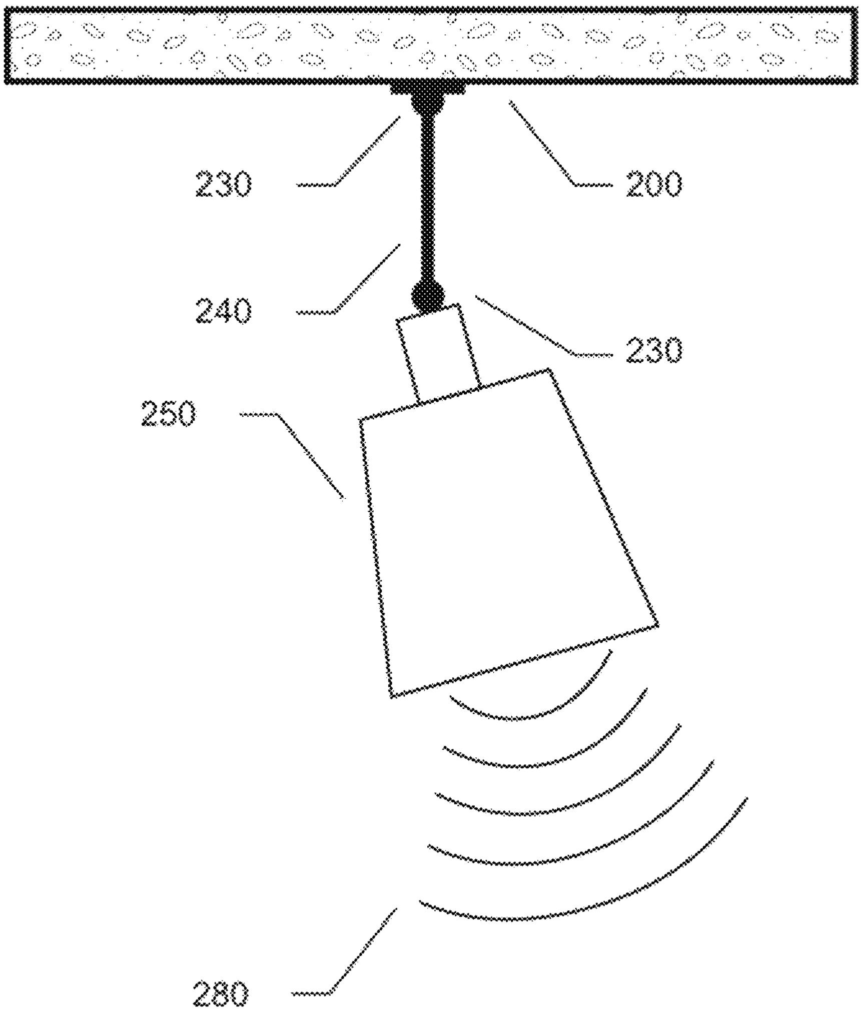
Figure 2C:
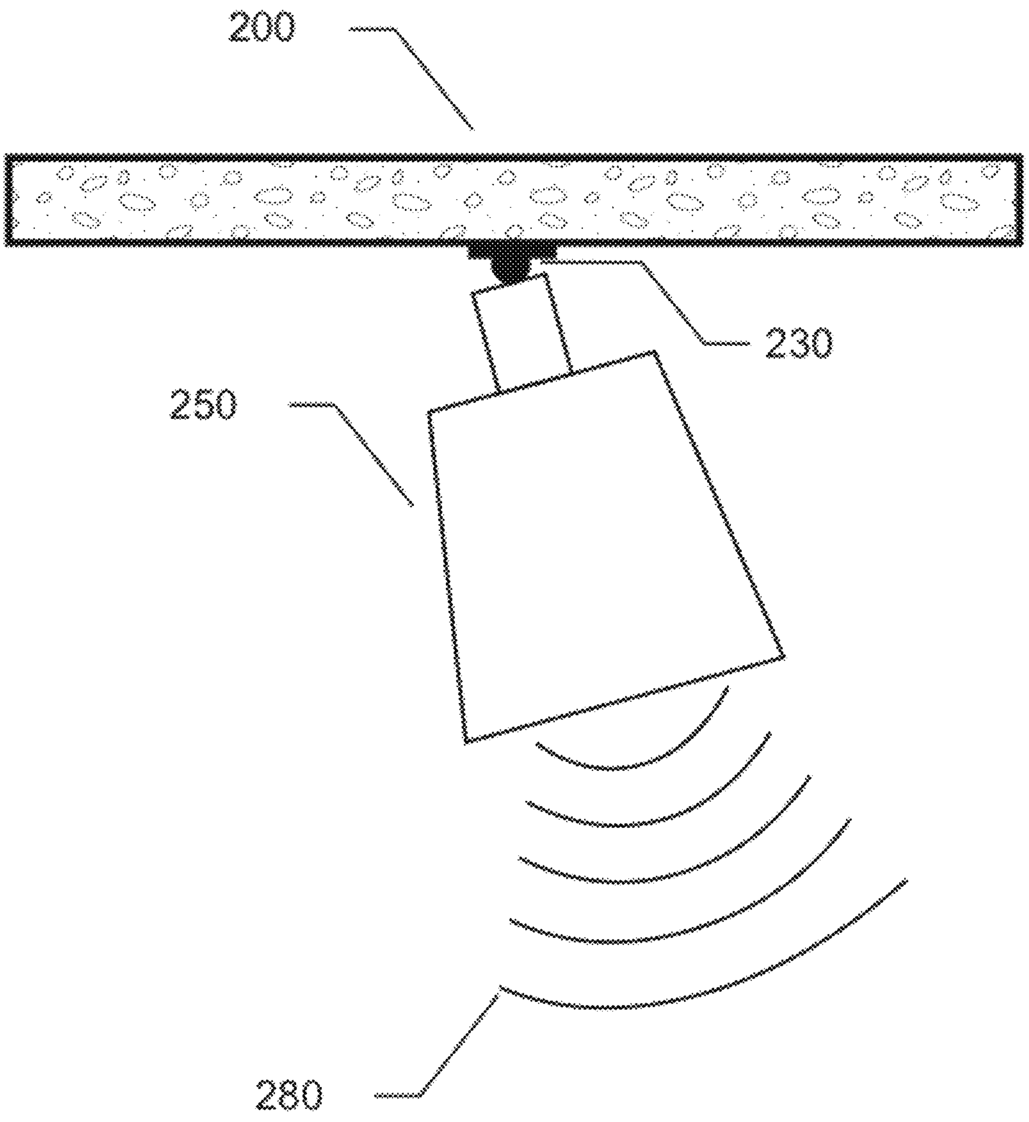
Figure 2D:
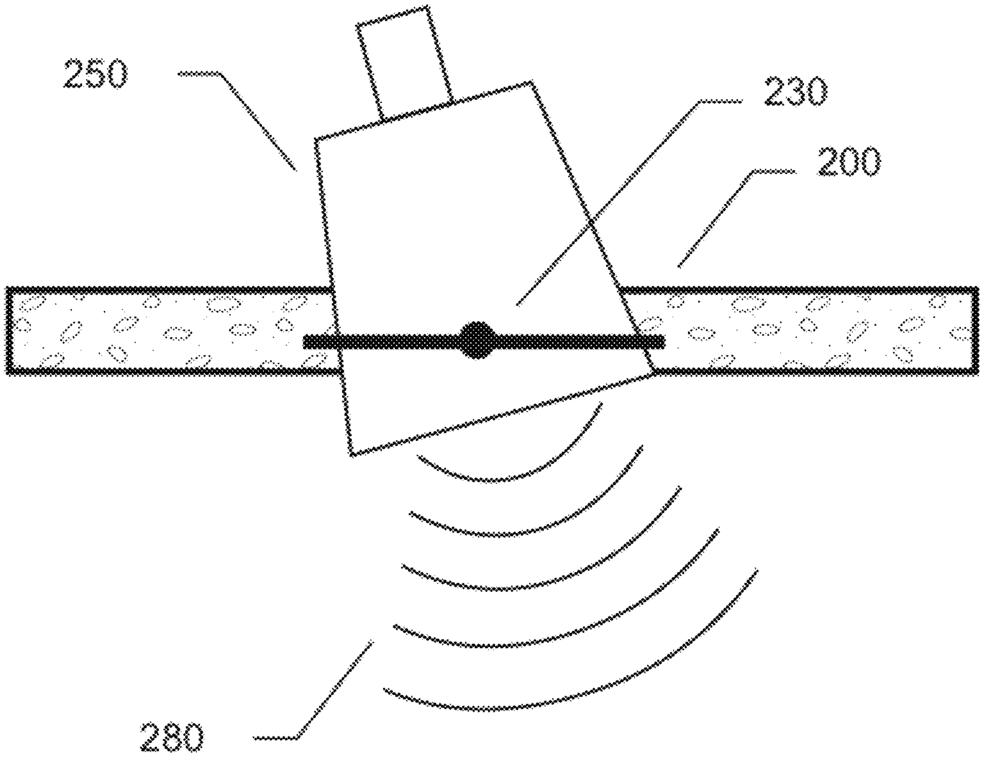
Figure 3A:
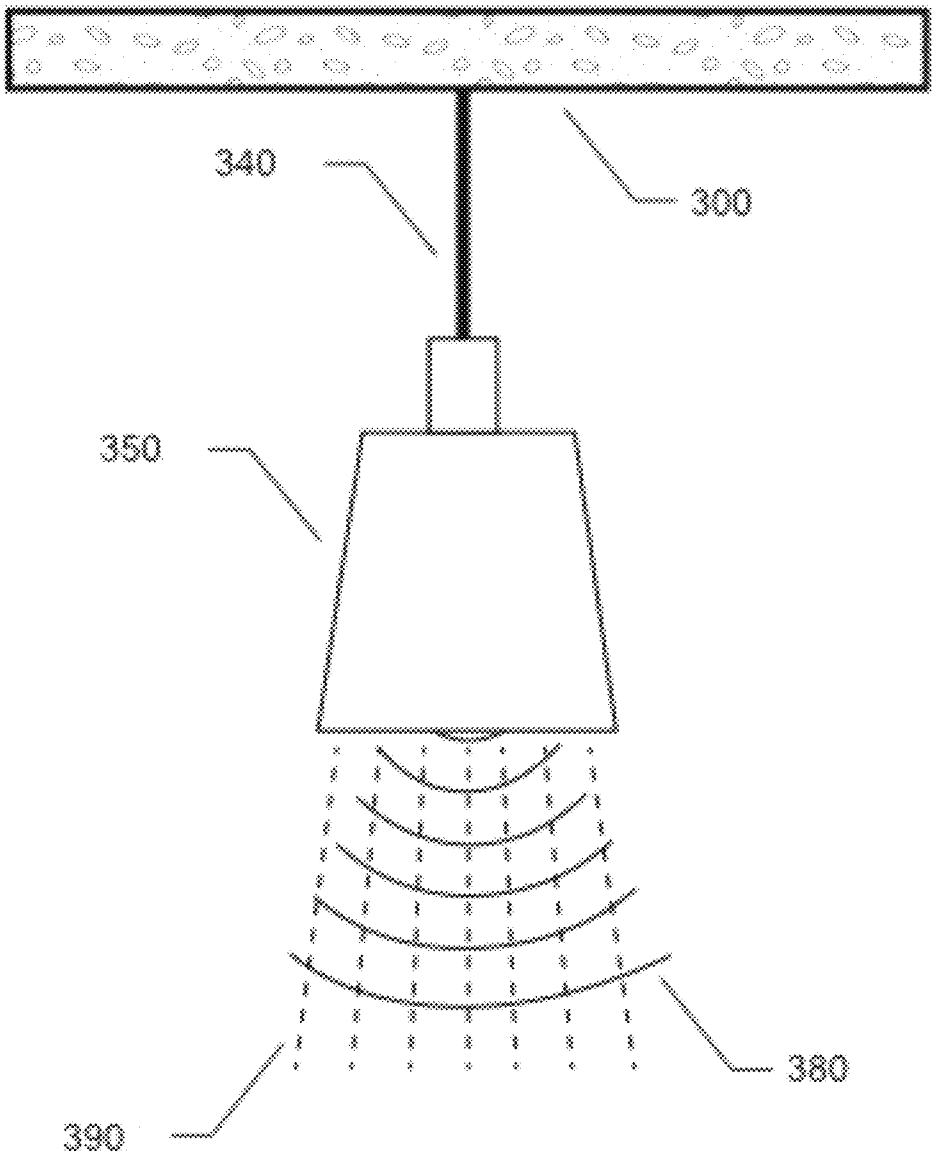
FIG. 3A-3D are illustrations of four embodiments of a noise cancelling speaker that are installed on a structure, such as a wall or ceiling, and include a lighting source or fixture.
Figure 3B:
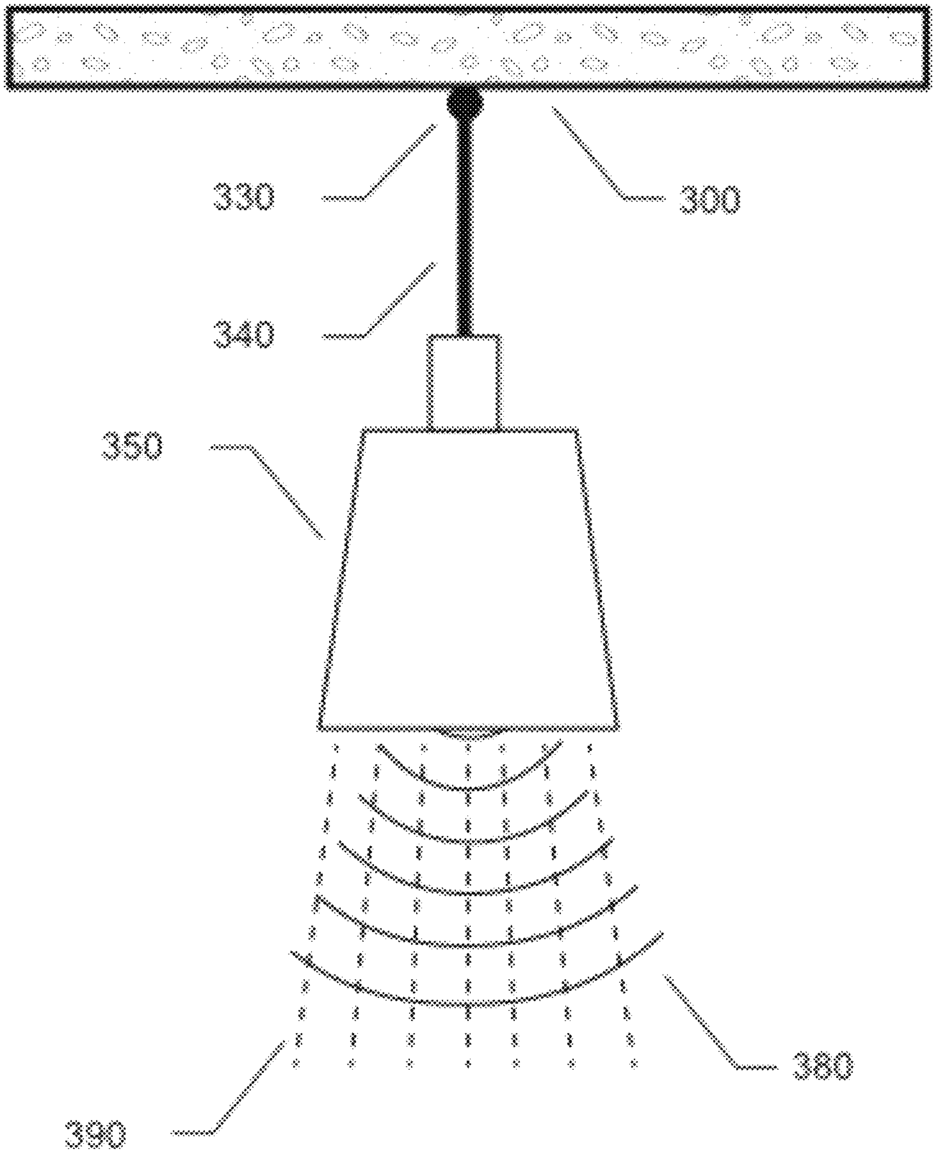
Figure 3C:
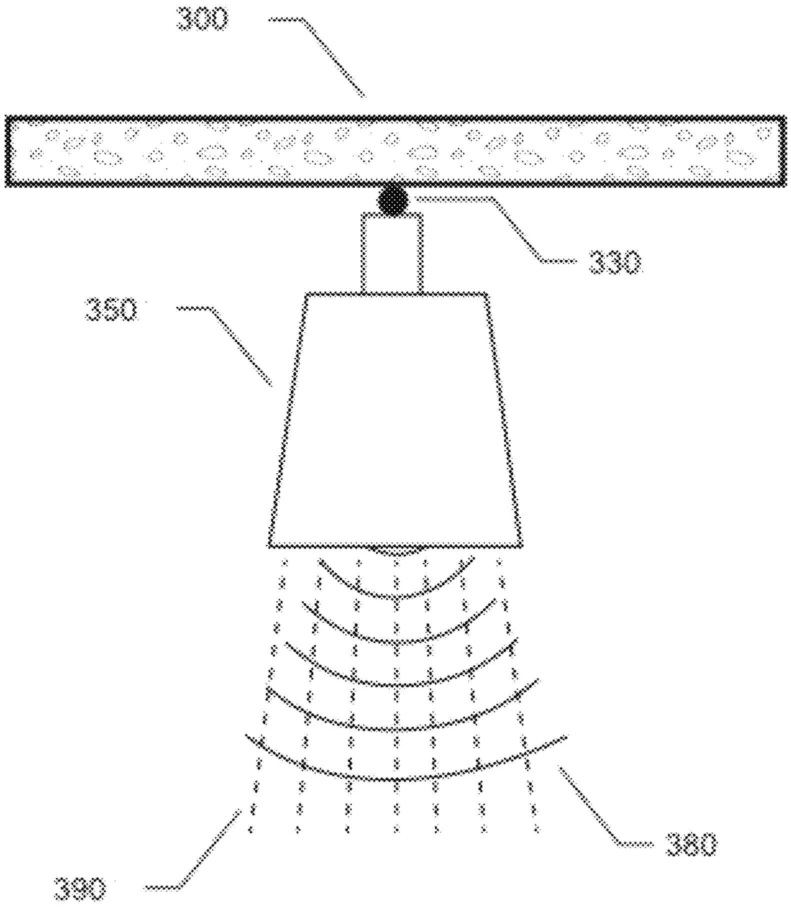
Figure 3D:
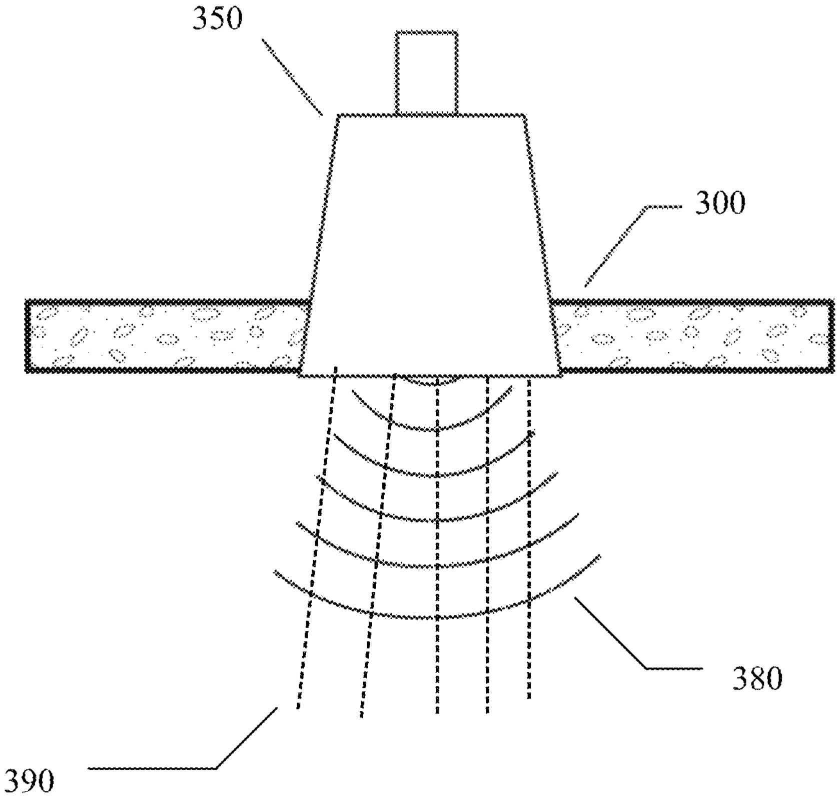
Figure 4A:
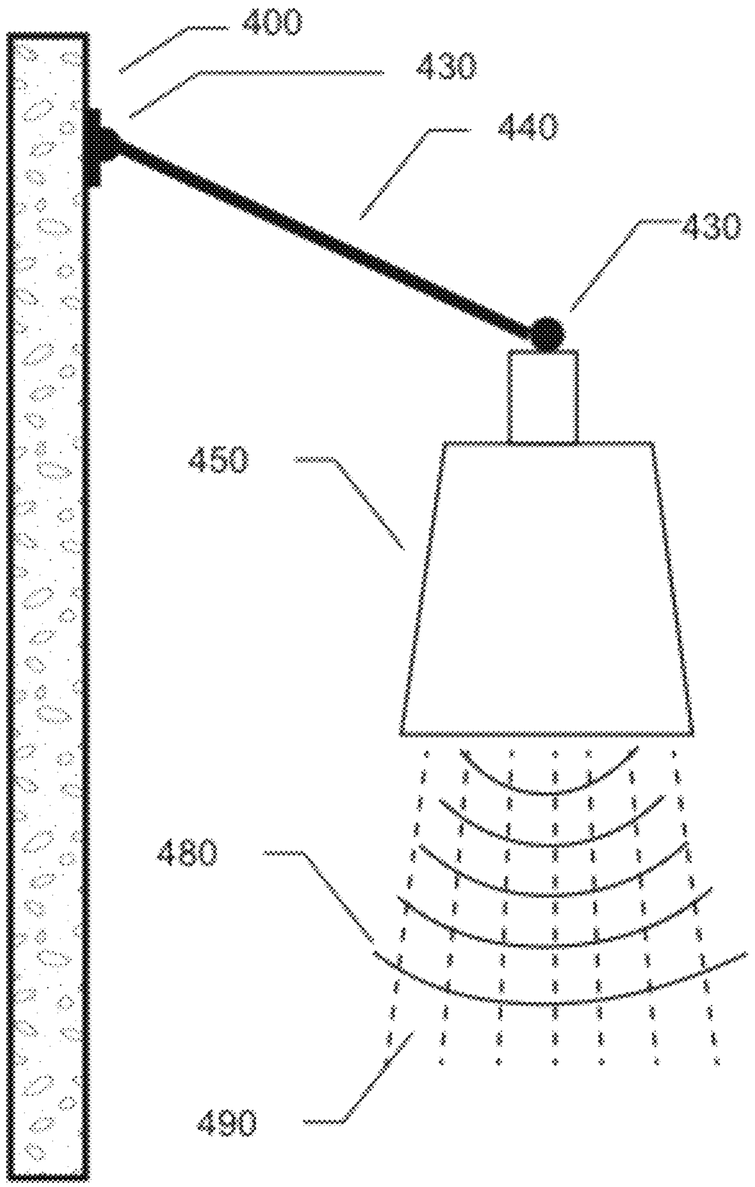
FIG. 4A-4D are illustrations of four other embodiments of a noise cancelling speaker that are installed on a structure, such as a wall or ceiling, and include a lighting source or fixture.
Figure 4B:
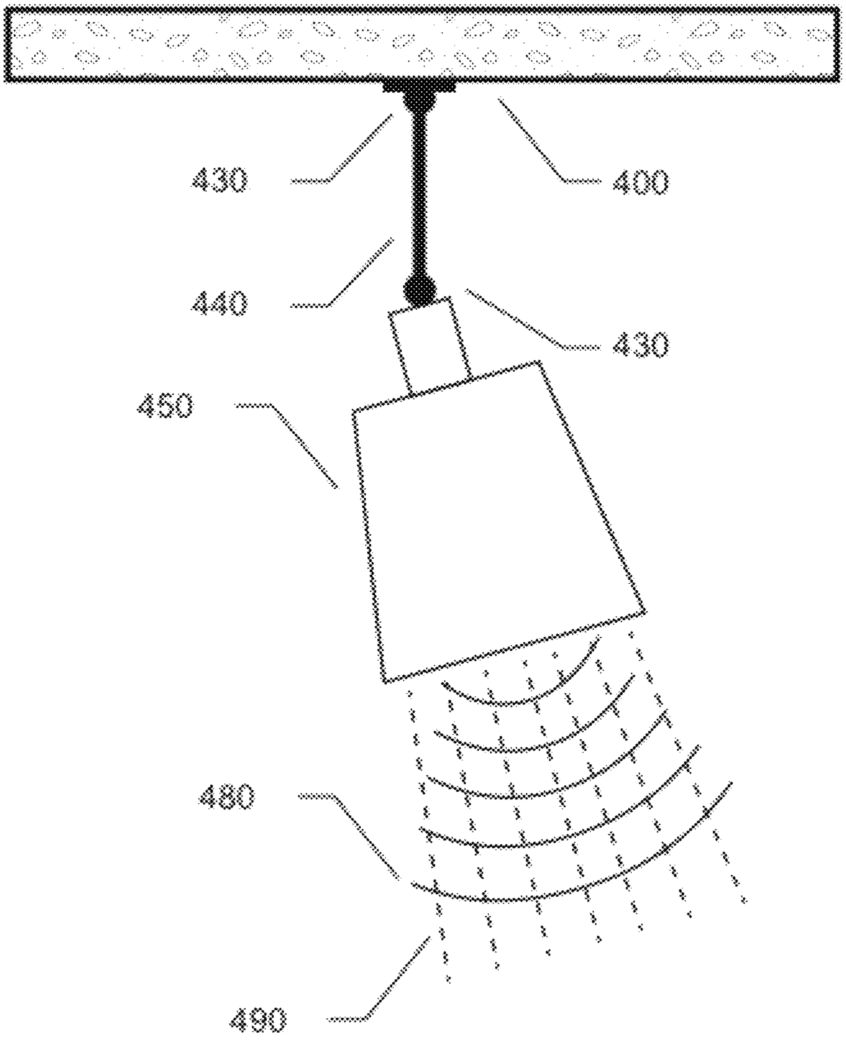
Figure 4C:
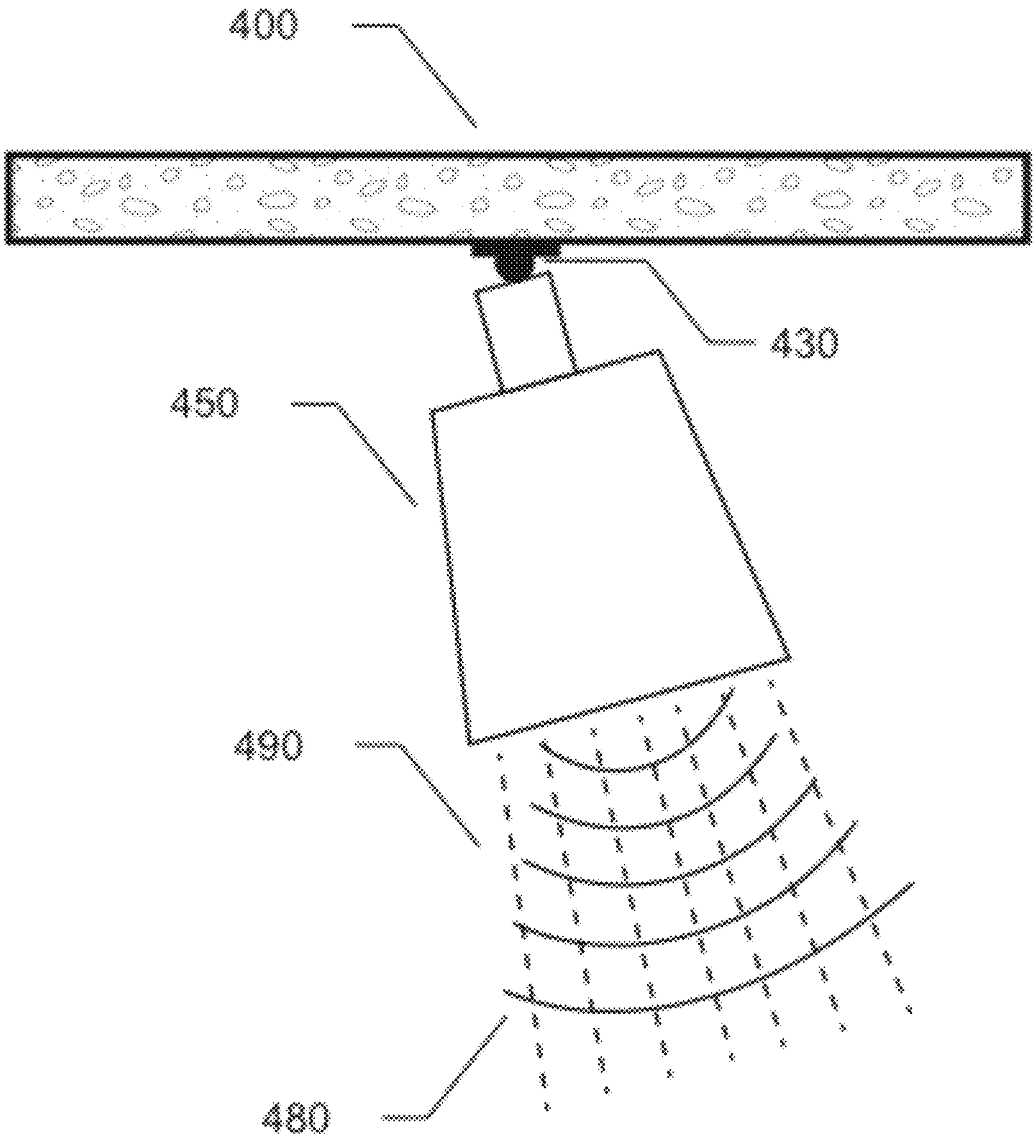
Figure 4D:
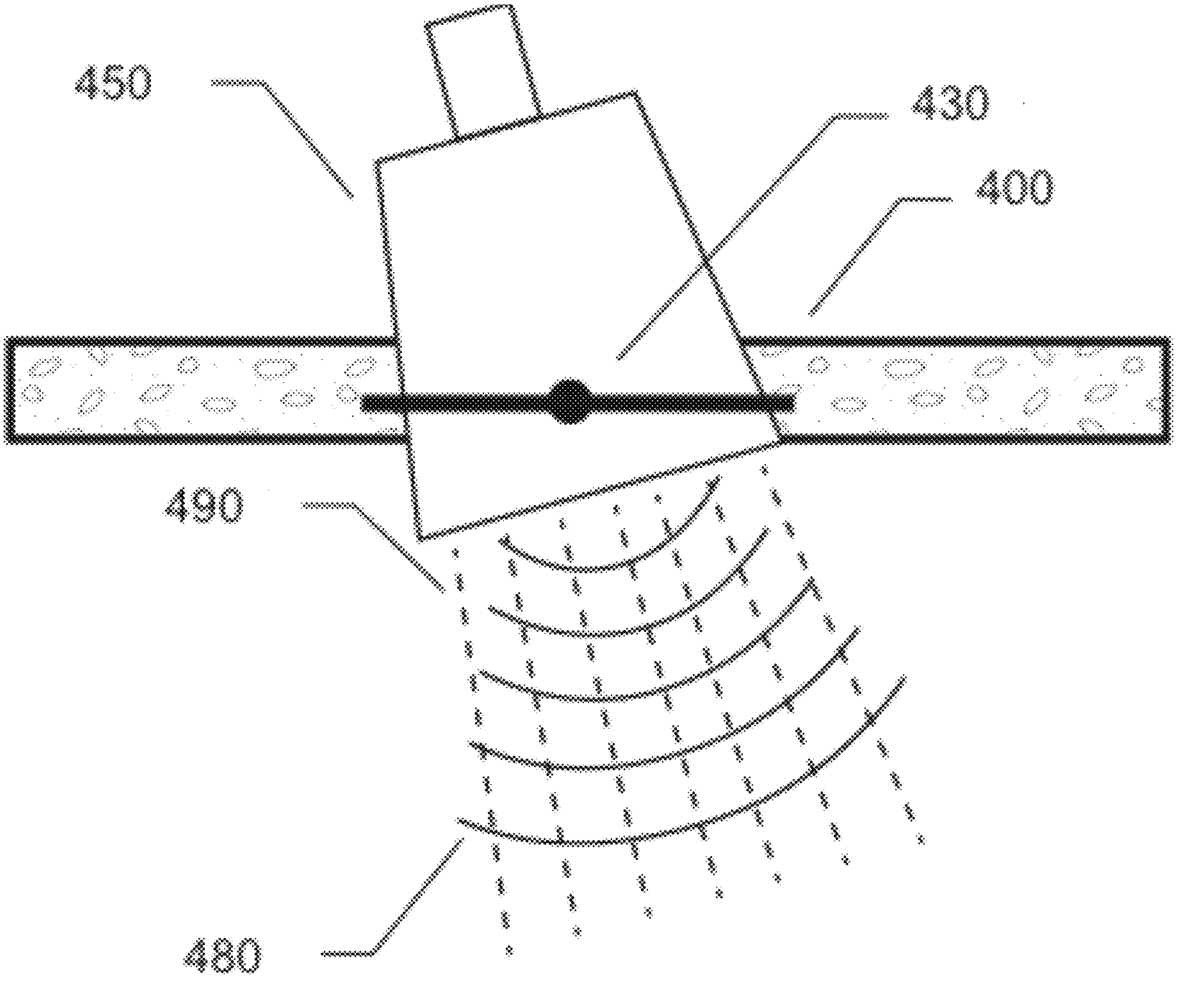

In the following detailed description of various embodiments, numerous specific details are set forth in order to provide a thorough understanding of various aspects of the embodiments. However, these embodiments may be practiced without some or all of these specific details. In other instances, well-known methods, procedures, and/or components have not been described in detail so as not to unnecessarily obscure aspects of the embodiments.

While multiple embodiments are disclosed, still others will become apparent to those skilled in the art from the following detailed description. As will be realized, these embodiments are capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about," may refer to a deviance of between 0.0001-20% from the indicated number or range of numbers.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are signified both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term "noise cancelling speaker" generally refers to a speaker, system, or array of sound equipment that may be equipped with active noise cancelling technology.

"Ambient sound(s)" and "ambient sound waves" refer generally to sounds waves present in the vicinity of a noise cancelling speaker of the present disclosure. This includes, but is not limited to, electronically generated audio (such as that produced by a loudspeaker in response to an electrical signal) and naturally generated audio (such as that produced by people talking, traffic and construction noises, etc.).

"Disruptive Audio" refers to any ambient sound waves that a user of a noise cancelling sound speaker of the present disclosure is not actively trying to listen to, or is trying to avoid listening to.

The terms "negative sound wave(s)" and "negative sound output pattern" refer to machine-generated soundwaves that are calculated to destructively interfere with a counterpart disruptive audio.

"Media" refers to any form of audio and/or audiovisual content that includes an audio component for listeners to hear.

"View" refers to the act of engaging with audio and/or audiovisual media, regardless of whether the viewer is looking and listening, or only listening.

The term "set" generally refers to a group of things, such as loudspeakers, but there may be only one thing in any specific group.

Embodiments of the present disclosure generally relate to the field of speakers. More specifically, the present disclosure relates to a noise cancelling speaker which, through a combination of a small form factor, targeted audio output, and active noise cancelling, allows its users to listen to audio or audiovisual media without disturbing nearby users.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments. It is to be understood that the methods and systems are not limited to specific methods, specific components, or to particular implementations. It is also to be understood that the terminology used herein is for the purpose of describing particular embodiments only and is not intended to be limiting.

FIG. 1A-1D are illustrations of four embodiments of a noise cancelling speaker that are installed on a structure, such as a wall or ceiling. As shown in FIGS. 1A-1D, speaker 150 is mounted to structure 100, such as a ceiling, truss, wall, or beam. Speaker 150 may produce sound 180. Speaker 150, which may preferably be a noise cancelling speaker, may be connected to support 140, which may be a rod, pole, cable, or wire, which may be then mounted into the surface of structure 100. When connected to mount 130, the position of speaker 150 may be adjusted.

FIG. 2A-2D are illustrations of four other embodiments of a noise cancelling speaker that are installed on a structure, such as a wall or ceiling. As shown in FIGS. 2A-2D, speaker 250, which may preferably be a noise cancelling speaker, may be mounted to a structure 200, such as a wall, ceiling, truss, or beam. Speaker 250 may produce sound 280. Speaker 250 may be connected to support 240, which may be a rod, pole, cable, or wire, which may then be mounted into the surface of a wall, such as structure 200. When connected to mount 230, the position of speaker 250 may be adjusted.

FIG. 3A-3D are illustrations of four embodiments of a noise cancelling speaker that are installed on a structure, such as a wall or ceiling, and include a lighting source or fixture. As shown in FIGS. 3A-3D, speaker 350, which may preferably be a noise cancelling speaker, may be mounted to structure 300, such as a ceiling, truss or beam. Speaker 350 may produces sound 380 and light 390. Speaker 350 may be connected to support 340, which may be a rod, pole, cable, or wire, which may then be mounted into the surface of a wall or ceiling, such as structure 300. When connected to mount 330, the position of speaker 350 may be adjusted.

FIG. 4A-4D are illustrations of four other embodiments of a noise cancelling speaker that are installed on a structure, such as a wall or ceiling, and include a lighting source or fixture. As shown in FIGS. 4A-4D, speaker 450, which may preferably be a noise cancelling speaker, may be mounted to structure 400, such as a ceiling, truss or beam. Speaker 450 may produces sound 480 and light 490. Speaker 450 may be connected to support 440, which may be a rod, pole, cable, or wire, which may then be mounted into the surface of a wall or ceiling, such as structure 400. When connected to mount 430, the position of speaker 450 may be adjusted.

Figure 5A:
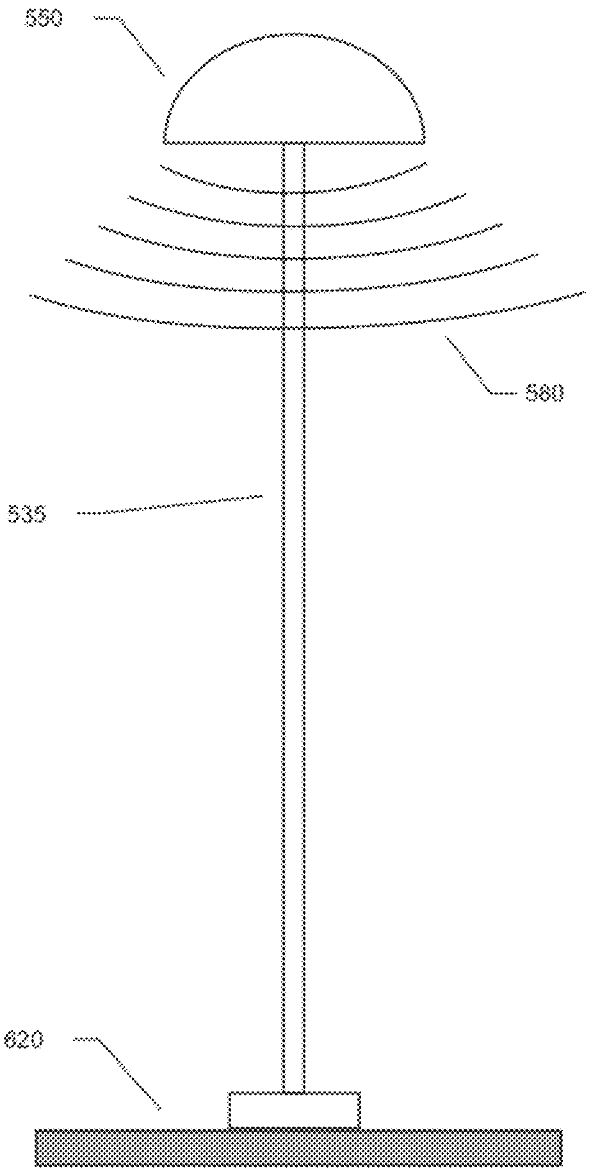
FIG. 5A is an illustration of one embodiment of a noise cancelling speaker that is installed on a standing floor structure.

FIG. 5A is an illustration of one embodiment of a noise cancelling speaker that is installed on a standing floor structure.

Figure 5B:
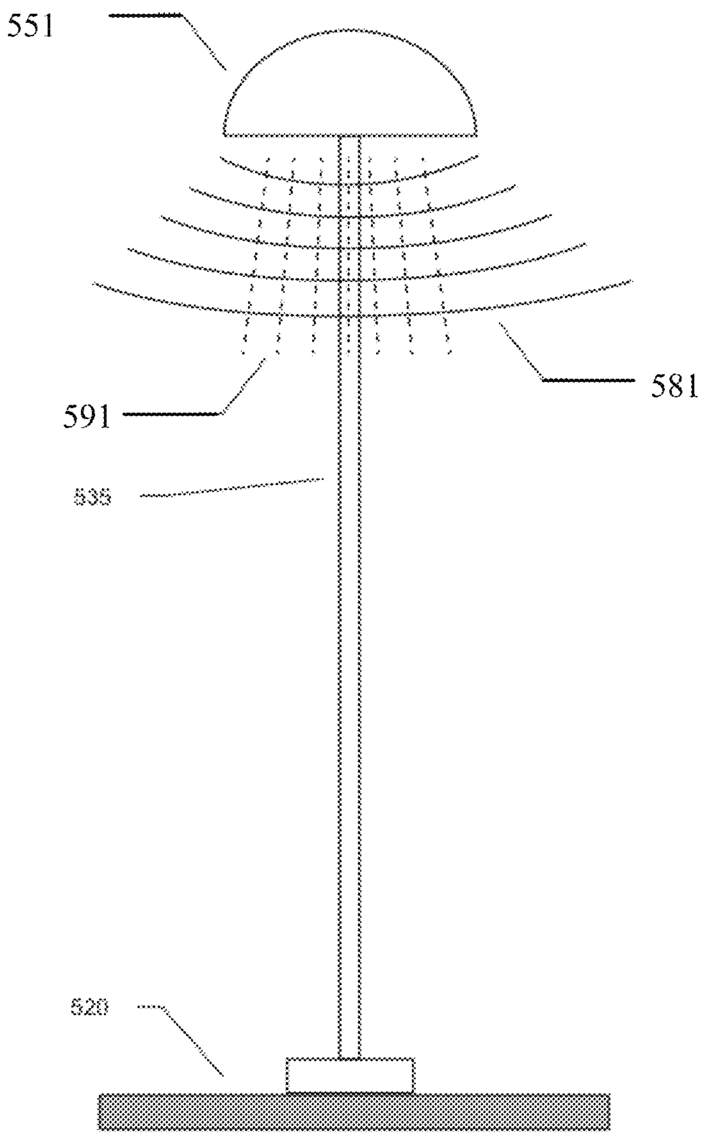
FIG. 5B is an illustration of one embodiment of a noise cancelling speaker that is installed on a standing floor structure, such as a floor lamp.

FIG. 5B is an illustration of one embodiment of a noise cancelling speaker that is installed on a standing floor structure, such as a floor lamp.

As shown in FIGS. 5A and 5B, speakers 550, 551 may be mounted to stand 535 that is mounted to or sits on a surface such as the floor 520. Speakers 550, 551 may produce sound 580, 581, and, if the option is included, light 590.

Figure 6A:
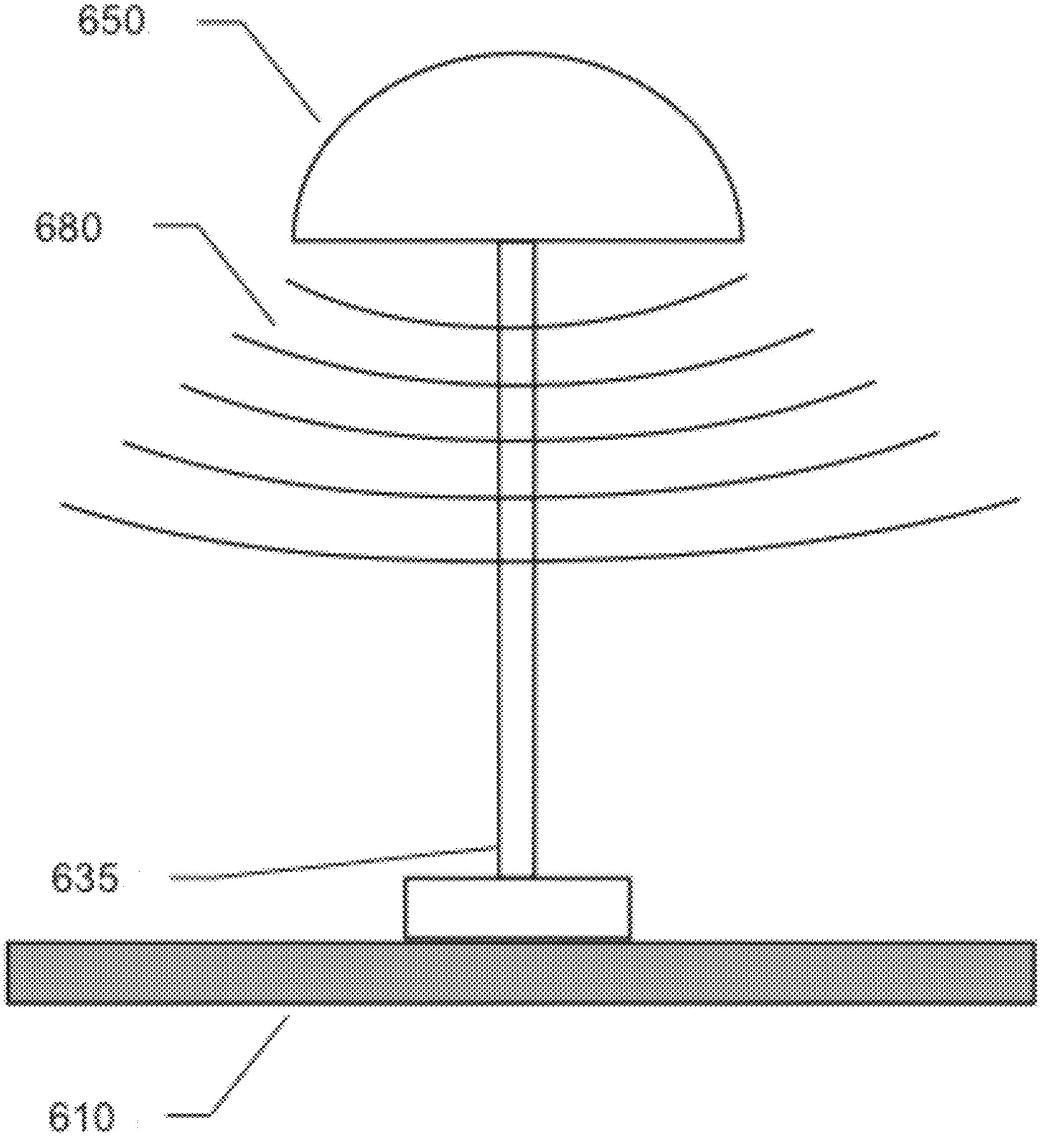
FIG. 6A-6D are illustrations of four embodiments of a noise cancelling speaker that sits on table and may or may not include a lighting fixture or source.
Figure 6B:
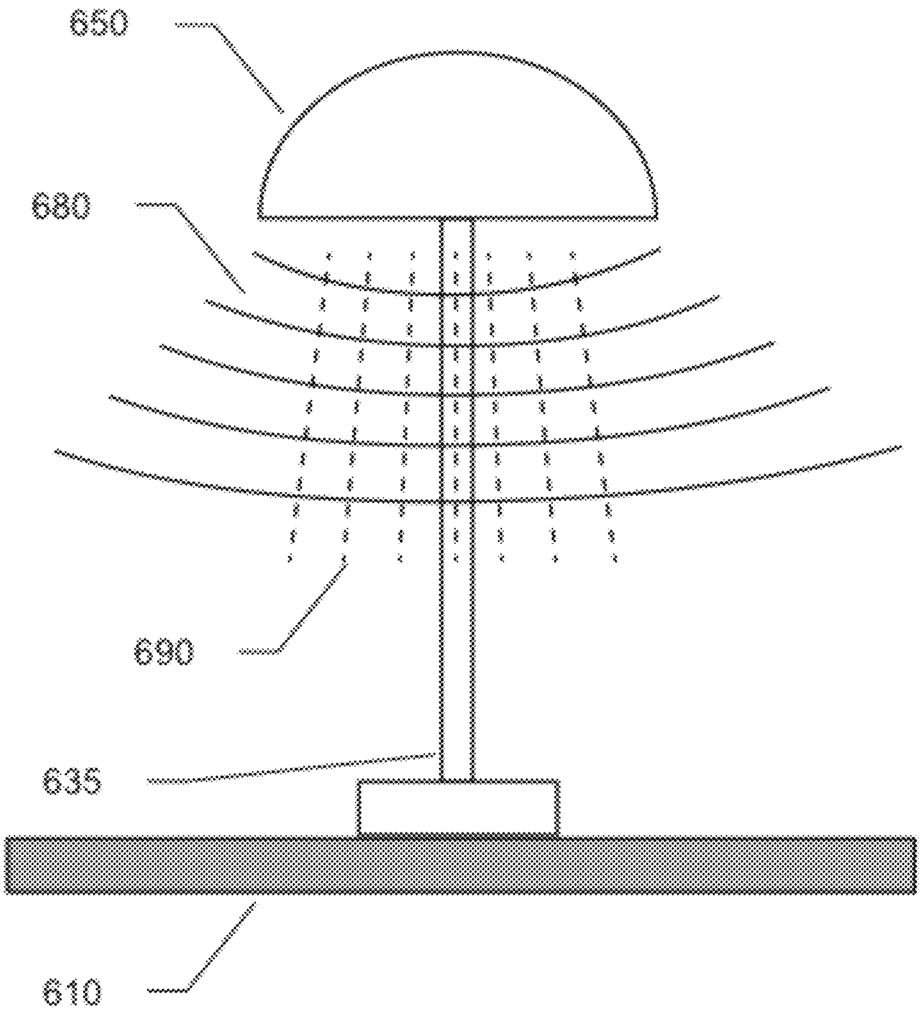
Figure 6C:
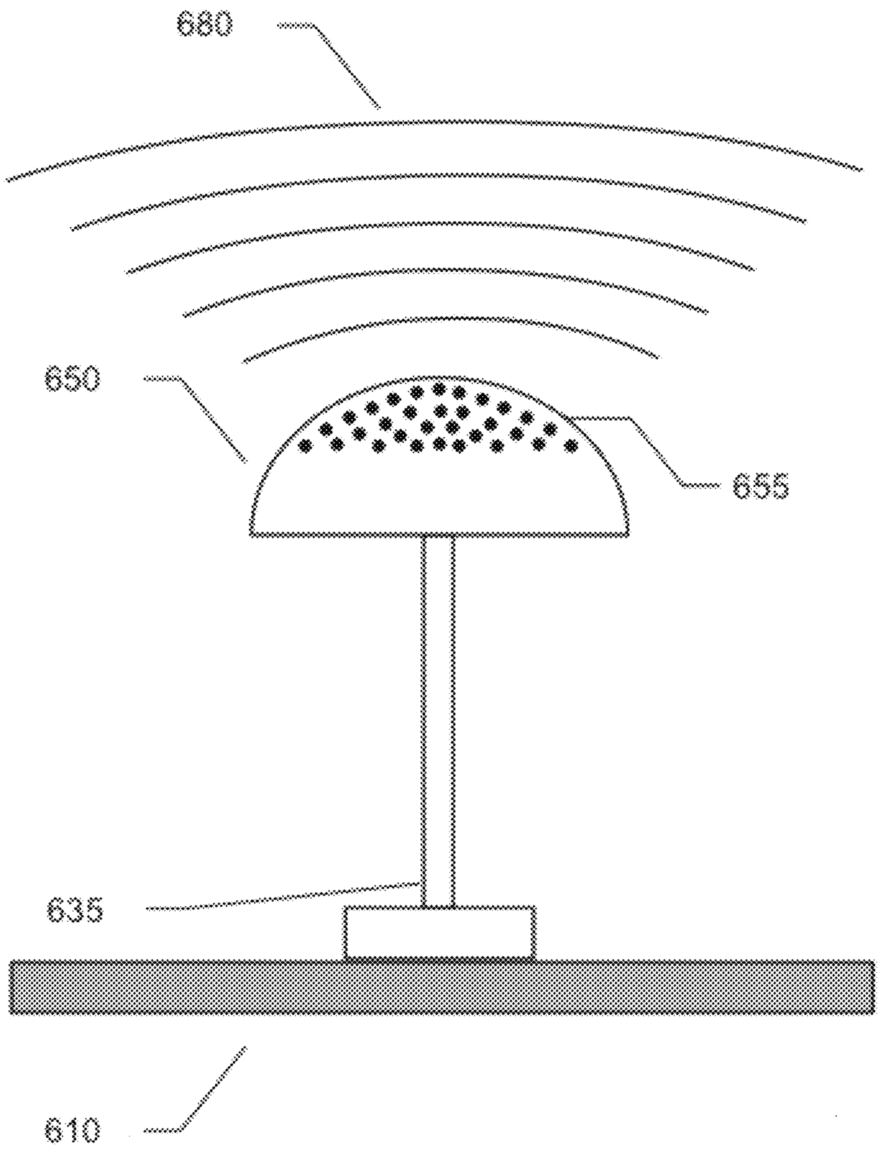
Figure 6D:
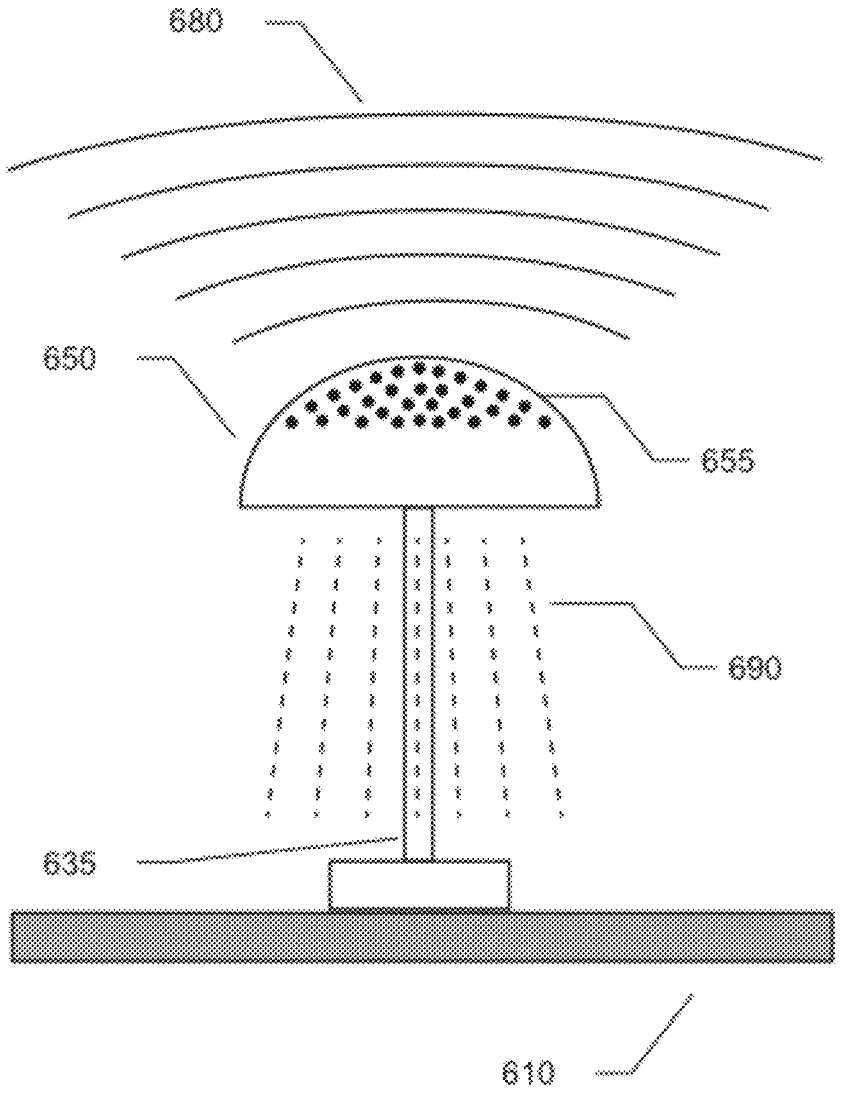

FIG. 6A-6D are illustrations of four embodiments of a noise cancelling speaker that sits on table and may or may not include a lighting fixture or source. As shown in FIGS. 6A-D, speaker 650 may be mounted to stand 635, which may rest on or be connected to surface 610, which may be a table, bar, or other horizontal surface. Speaker 650 may produce sound 680 and, if the option is included, light 690. Speaker 650 may direct the noise cancelling soundwaves 680 downward, as shown in FIGS. 6A and 6B. Alternatively, speaker 650 may direct the noise cancelling soundwaves 680 upward, as shown in FIGS. 6C and 6D, via holes 655, which permit the sound 680 to pass through the top of speaker 650.

Figure 7A:
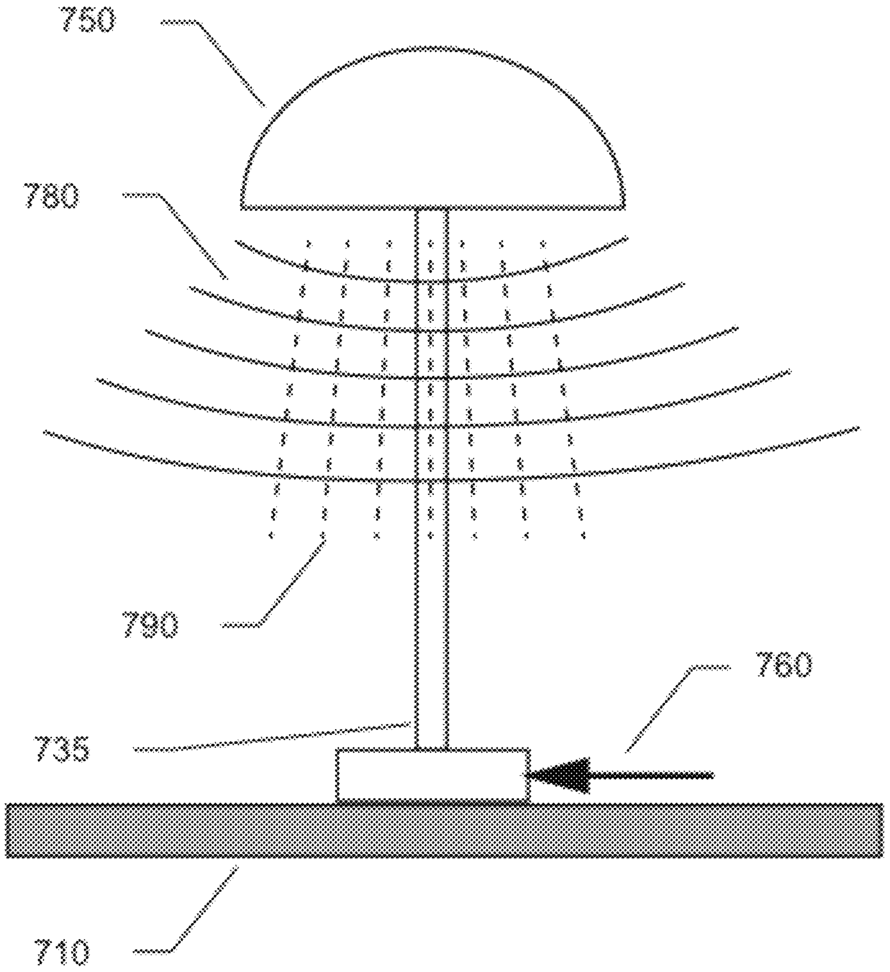
FIG. 7A-7D are illustrations of four embodiments of a noise cancelling speaker that sits on table and may or may not include a lighting fixture or source, and may be battery powered.
Figure 7B:
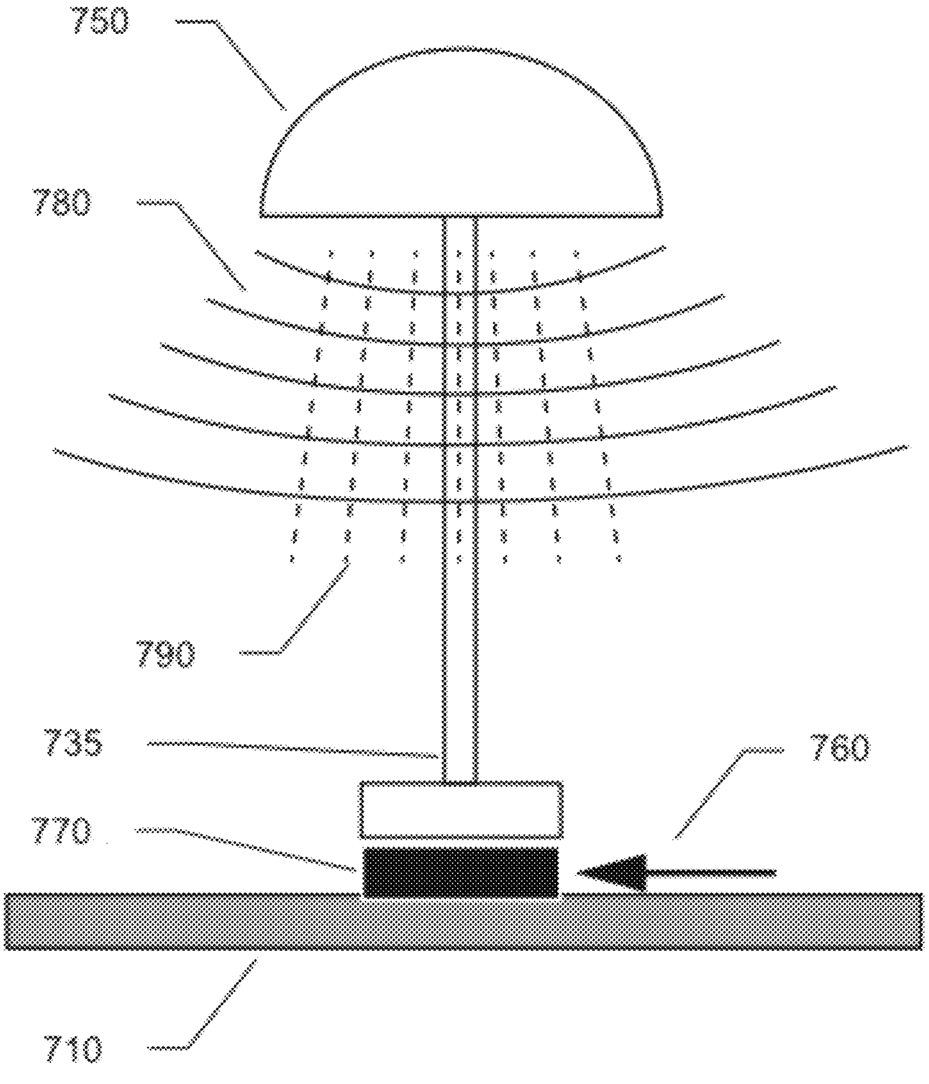
Figure 7C:
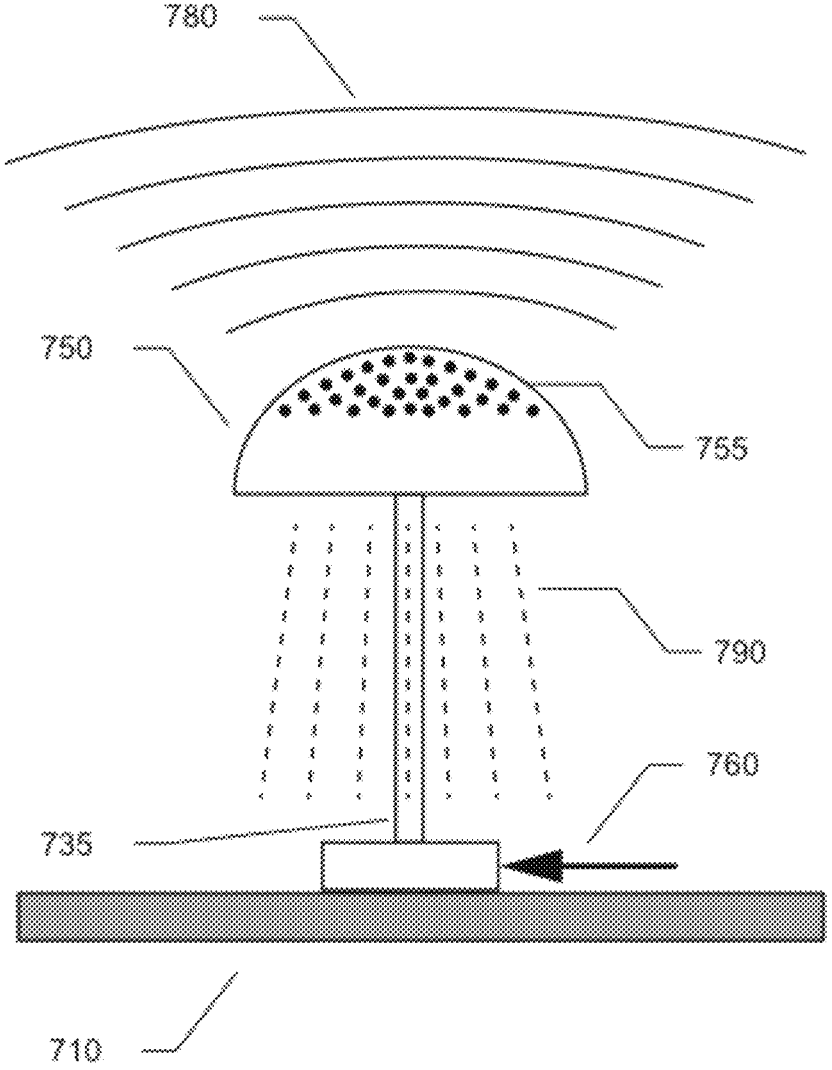
Figure 7D:
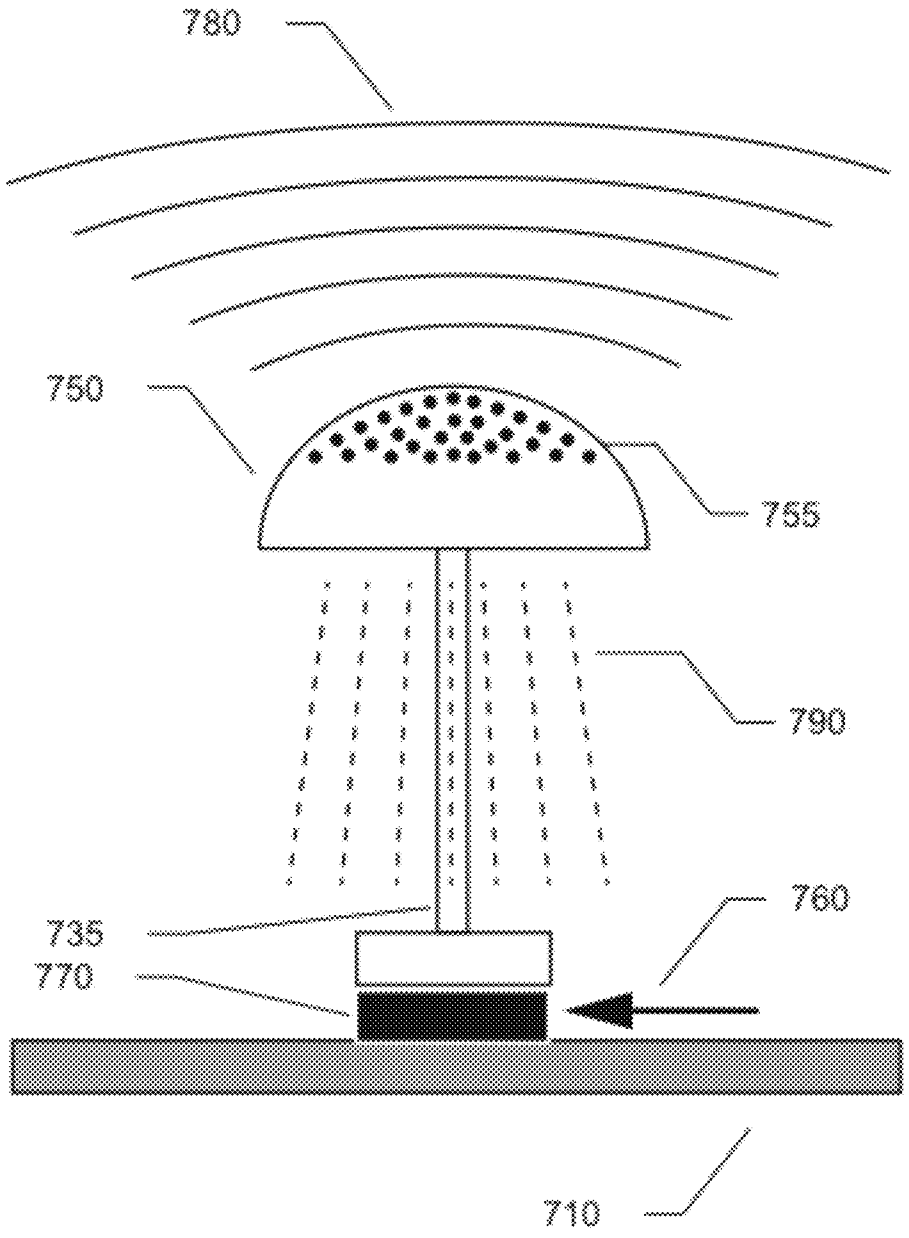

FIG. 7A-7D are illustrations of four embodiments of a noise cancelling speaker that sits on table and may or may not include a lighting fixture or source, and which may be battery powered. As shown in FIGS. 7A-7D, speaker 750 may be mounted to stand 735 that may rest on or be connected to surface 710, which may be a table, bar, or other horizontal surface. Speaker 750 may produce sound 780 and, if the option is included, light 790. Speaker 750 may direct the noise cancelling soundwaves 780 downward, as shown in FIGS. 7A and 7B. Alternatively, speaker 750 may direct the noise cancelling soundwaves 780 upward, as shown in FIGS. 7C and 7D, via holes 755, which permit the sound 780 to pass through the top of speaker 750. In these embodiments, speaker 750 may be powered using an internal battery that may be either a disposable or a rechargeable battery. For rechargeable batteries, the internal battery may be recharged when connected to power source 760 or via induction or contact charging using charging base 770, which may be connected to power source 760.

Figure 8A:
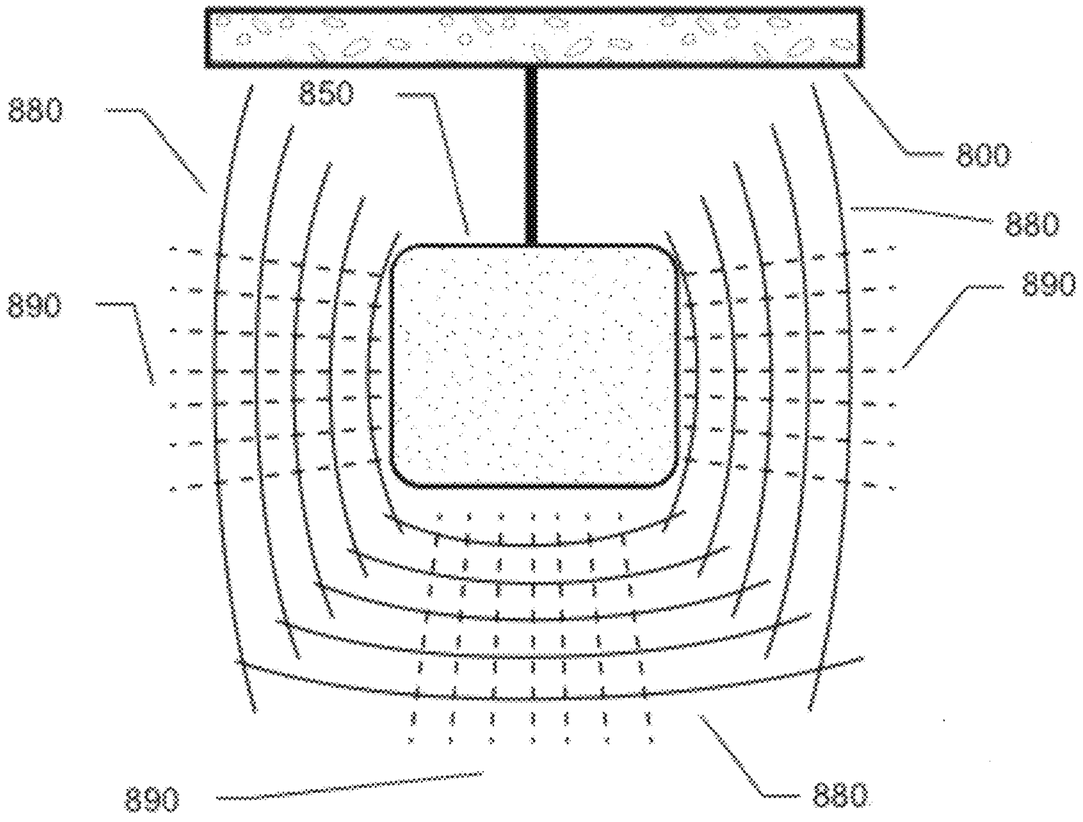
FIG. 8A-8C are illustrations of three other embodiments of a noise cancelling speaker that produces sound in more than one direction and/or different angles.
Figure 8B:
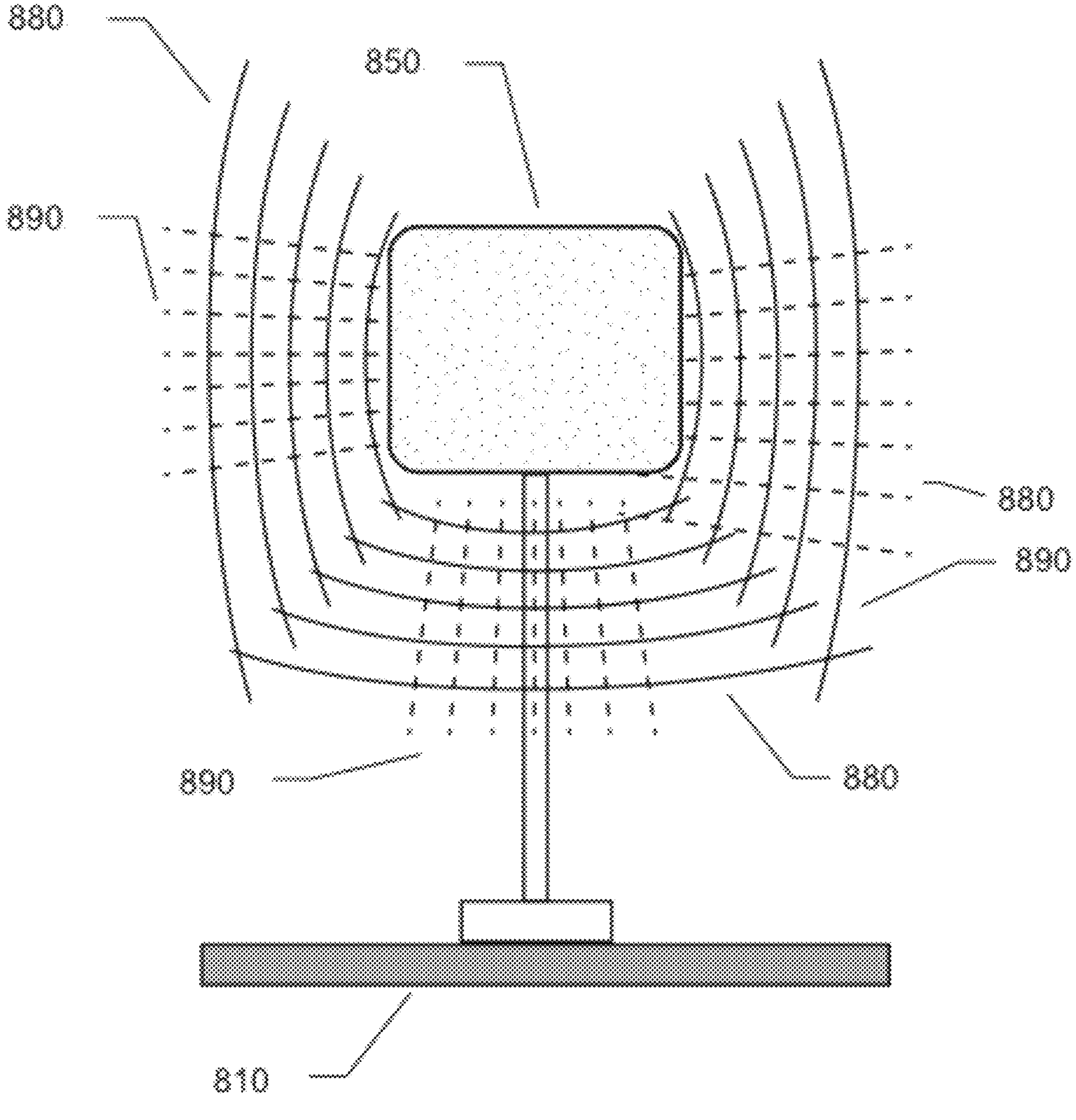
Figure 8C:
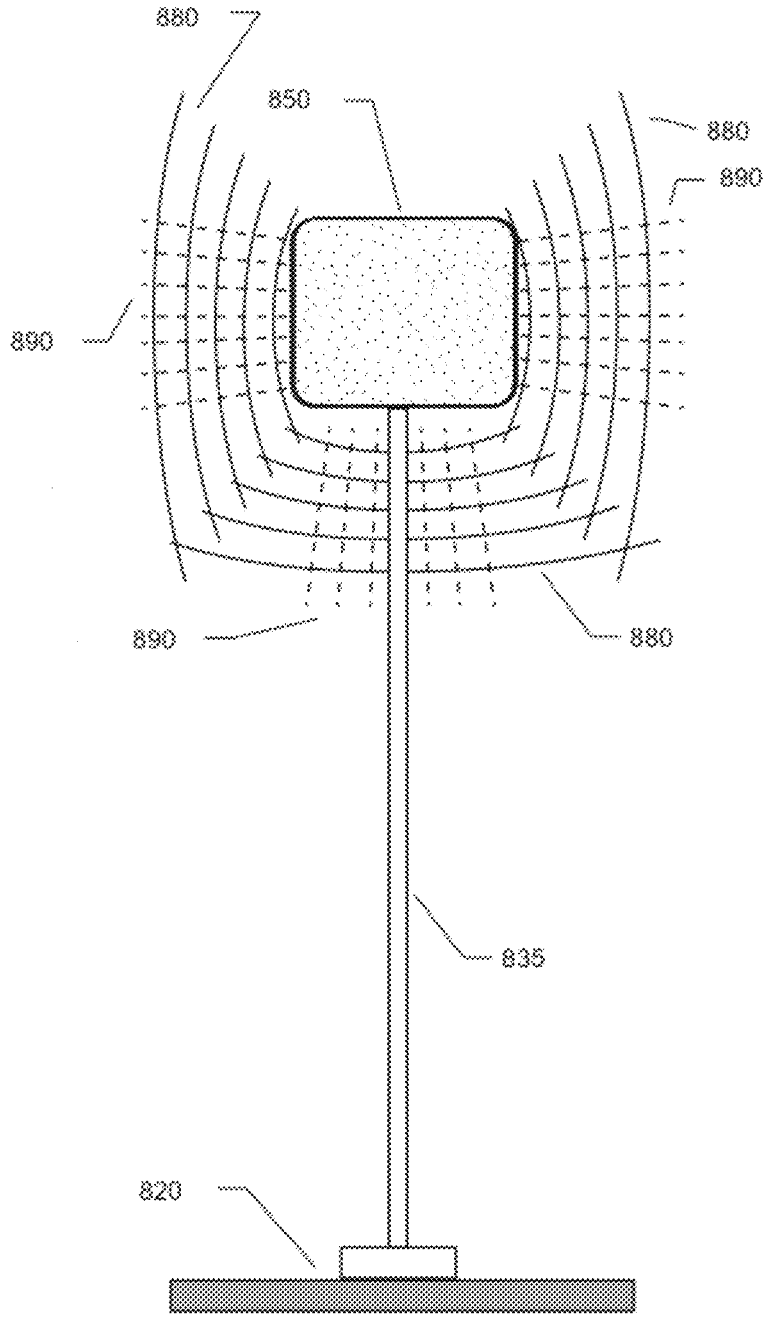

FIG. 8A-8C are illustrations of three other embodiments of a noise cancelling speaker that produces sound in more than one direction and/or different angles. As shown in FIG. 8C, speaker 850 may be mounted to stand 835, which may rest on or be connected to surface 820, such as a floor. FIG. 8B shows that speaker 850 may rest on or be connected to surface 810, such as a table. FIG. 8A shows that speaker 850 may be mounted to or suspended from surface 800, such as a ceiling. Preferably, speaker 850 produces noise cancelling sound 880 and, if the option is included, light 890. FIGS. 8A-8C show that sound 880 and/or light 890 may be directed in multiple directions.

Figure 9A:
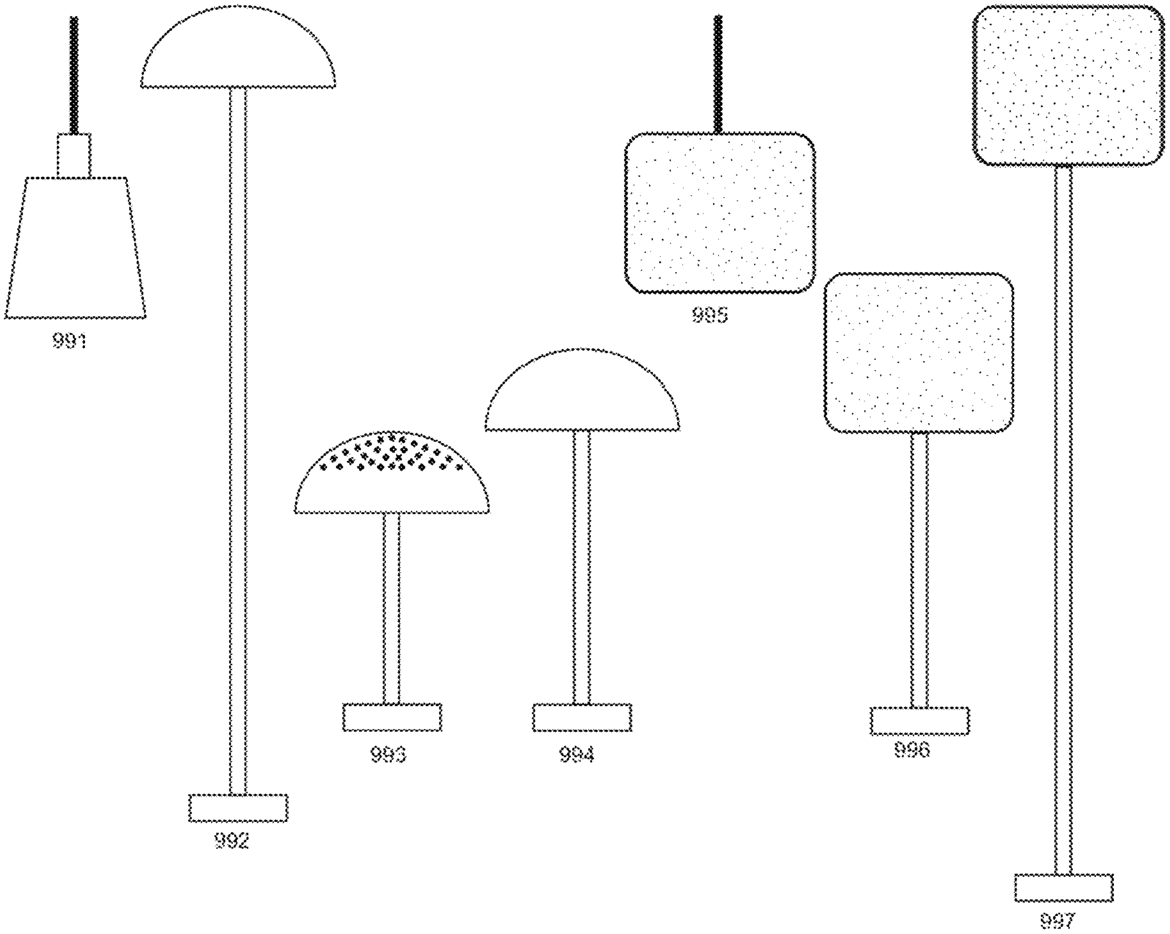
FIG. 9A is an illustration of various embodiments of the noise canceling speaker.

FIG. 9A is an illustration of various embodiments of the noise canceling speaker. FIG. 9A shows that the noise cancelling speaker may come in many different shapes and sizes, such as fixtures 990, 991, 992, 993, 994, 995, 996, 997. The noise cancelling speaker of the present disclosure may be embedded into or an integral part of any lamp or lighting structure. This allows noise cancelling speaker of the present disclosure to be included in any custom designed or off-the shelf lighting fixture.

Figure 9B:
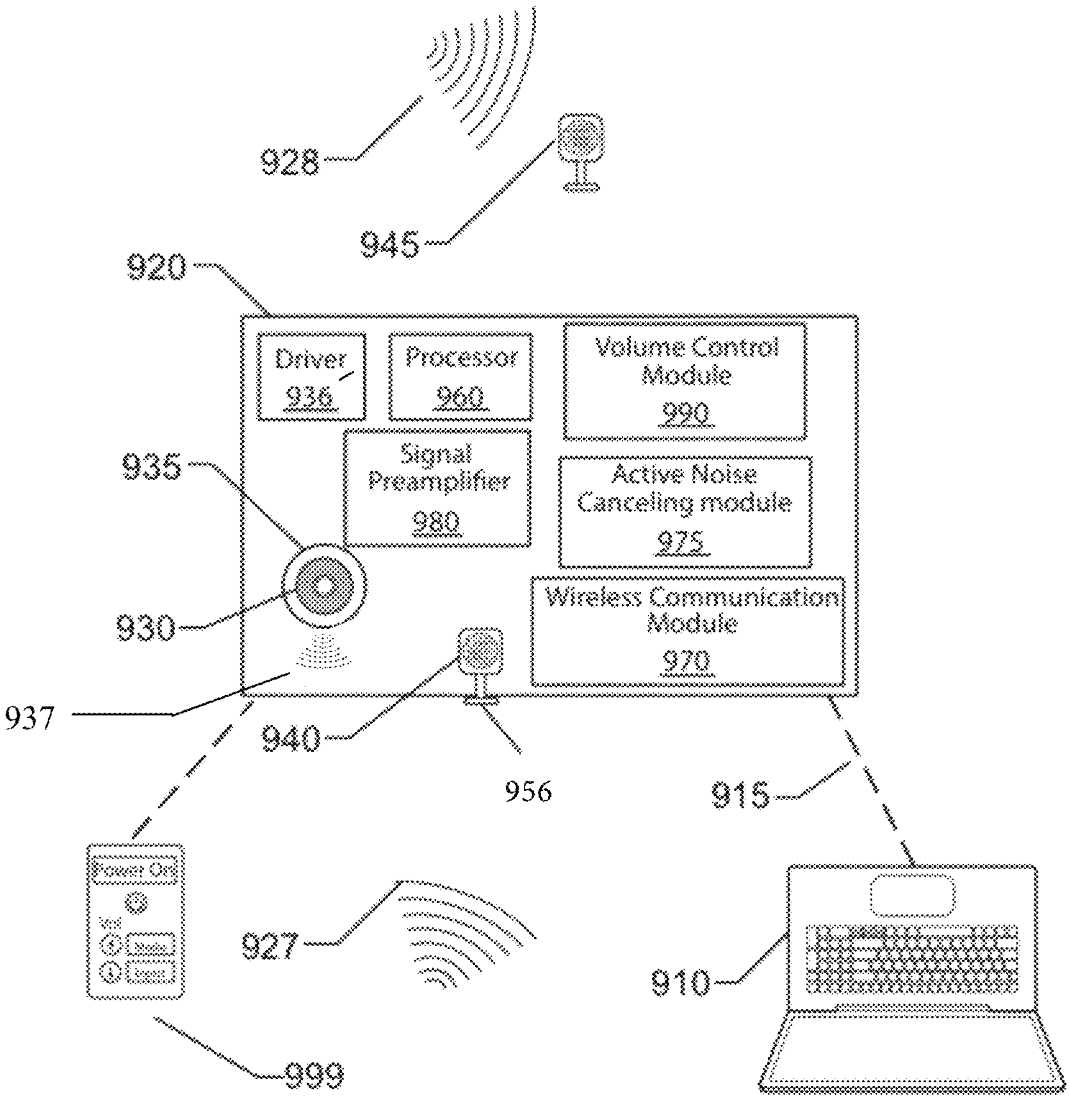
FIG. 9B is an illustration showing one embodiment of the noise cancelling speaker underlying systems.

FIG. 9B is an illustration showing one embodiment of the noise cancelling speaker underlying systems. The fixtures 990, 991, 992, 993, 994, 995, 996, 997 may comprise noise cancelling speaker 920, which may further comprise one or more loudspeakers 930 and one or more microphones 940. Preferably, the noise cancelling speaker 920 may comprise a processor 960, a wireless communication module 970, and a signal preamplifier 980 that operates the noise cancelling speaker 920. The noise cancelling speaker 920 may receive an audio input signal 915 from a media device 910, such as a television (TV), smartphone, tablet, or other device capable of playing audio and/or audiovisual media. The audio input signal 915 may be transmitted to the noise cancelling speaker 920 wirelessly and be received by the wireless communication module 970. The audio input signal 915 may, alternatively, be transmitted to the noise cancelling speaker 920 via a wired connection.

The audio input signal 915 may be enhanced by the signal preamplifier 980, and then subsequently transmitted to the one or more loudspeakers 930 for the user to hear. The one or more loudspeakers 930 may use the (amplified) audio input signal 915 to create a speaker output audio 937. The speaker output audio 937 may be a faithful reproduction of the audio input signal 915 received from the media device 910, albeit enhanced and/or amplified. In situations in which the media device 910 includes loudspeakers of its own, the media device 910 loudspeakers may preferably be powered down while the noise cancelling speaker 920 are in use, such that only the noise cancelling speaker 920 are generating audible sounds pertaining to the media that the user is viewing and listening. The volume of the speaker output audio 937 may be controlled by a volume control module 990, which may allow communication with, for example, a control interface 999.

The one or more loudspeakers 930 may be mounted on a rotatable (or otherwise moveable/adjustable) base 935, which may be controlled by driver 936. The rotatable base 935 may be underneath the one or more loudspeakers 930 and may be used to adjust the angle of the one or more loudspeakers 930, thereby adjusting the directional output of the speaker output audio 937. In this manner, the one or more loudspeakers 930 may be adjusted such that the speaker output audio 937 may be precisely aimed (or otherwise directed) at a user's ears. As a result, a lower volume is required for the speaker output audio 937 to be clearly heard by the user.

The noise cancelling speaker 920 may further comprise one or more microphones 940, which may be used to measure or otherwise determine an ambient noise 927. The ambient noise 927 may be processed by an active noise cancelling module 975, to create a negative output audio that may destructively interfere with the ambient noise 927 when combined with the ambient noise 927. Preferably, the negative output audio may be emitted from the one or more loudspeakers 930, such that the negative output audio largely cancels out any disruption by the ambient noise 927 to a user of the noise cancelling speaker 920. The one or more microphones 940 may be mounted on rotatable (or otherwise moveable/adjustable) bases 956, which may be used to adjust the angle of the one or more microphones 940 in order to improve the measurement of ambient noise 927. Bases 935, 956 may be controlled manually or by driver 936.

The noise cancelling speaker 920 may be in communication with one or more external (or remote) microphones 945, that are positioned apart from the noise cancelling speaker 920. The external microphone(s) 945 may connect to the noise cancelling speaker 920 via a wired or wireless interface. The external microphone(s) 945 may be used to measure ambient noise 928 (external ambient noise) not directly near (greater than 2 meters away) the noise cancelling speaker 920. The ambient noise 928 may be processed by an active noise cancelling module 975, to create a negative output audio which may destructively interfere with the ambient noise 928 when combined with the ambient noise 928. Preferably, the negative output audio may be emitted from the one or more loudspeakers 930, such that the negative output audio largely cancels out any disruption by the ambient noise 928 to a user of the noise cancelling speaker system 900. Preferably, the one or more external microphones 945 may be moveable and repositionable to areas in a room or outside of a room to most advantageously create a negative output audio for destructively cancelling the ambient noise 928. The external microphones 945 may be connected to moveable and rotatable bases similar to bases 935, 956.

The noise cancelling speaker 920 may be connected to one or more control interface 999, such as a remote control unit, which may be a separate unit or may be mounted into or onto the noise cancelling speaker 920 into room furnishings (i.e. base, table, etc.), into or onto a wall, or be used as a separate handheld device. The control interface 999 may connect to the noise cancelling speaker 920 via wired or wireless connectivity. The control interface 999 can also be operated and/or adjusted by the media device 910 (i.e., computers, smart phones, control systems). In other embodiments, the control interface 999 is a computer, smart phone, or other control system.

Unless otherwise stated, all measurements, values, ratings, positions, magnitudes, sizes, locations, and other specifications, which set forth in this specification, including in the claims that follow, are approximate, not exact. They are intended to have a reasonable range, which is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description, which shows and describes the illustrative embodiments. As will be realized, these embodiments are capable of modifications in various obvious aspects, all without departing from the spirit and scope of the present disclosure. Accordingly, the detailed description is to be regarded as illustrative in nature and not restrictive. Also, although not explicitly recited, one or more additional embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A noise cancelling system, comprising:

a first noise cancelling speaker; and a second noise cancelling speaker;

wherein said first noise cancelling speaker comprises: at least one first loudspeaker; at least one first microphone, which is configured to sense and measure a first ambient noise; a first active noise cancelling module, which is in communication with said at least one first loudspeaker and said at least one first microphone; at least one first adjustable loudspeaker base; and at least one first adjustable microphone base;

wherein said first active noise cancelling module is configured to process said first ambient noise to create a first negative output audio;

wherein said first negative output audio is configured to be projected from said at least one first loudspeaker;

wherein said first negative output audio, when projected from said at least one first loudspeaker, destructively interferes with said first ambient noise;

wherein said at least one first loudspeaker is mounted on said at least one first adjustable loudspeaker base;

wherein said at least one first microphone is mounted on said at least one first adjustable microphone base;

wherein said at least one first adjustable loudspeaker base is configured to be adjustable to adjust an angle of said at least one first loudspeaker, which adjusts said first negative output audio, such that said first negative output audio is configured to destructively interfere with said first ambient noise; and wherein said at least one first adjustable microphone base is configured to adjust an angle of said at least one first microphone to more accurately sense and measure said first ambient noise;

wherein said second noise cancelling speaker comprises: at least one second loudspeaker; at least one second microphone, which is configured to sense and measure a second ambient noise; a second active noise cancelling module, which is in communication with said at least one second loudspeaker and said at least one second microphone; at least one second adjustable loudspeaker base; and at least one second adjustable microphone base;

wherein said second active noise cancelling module is configured to process said second ambient noise to create a second negative output audio;

wherein said second negative output audio is configured to be projected from said at least one second loudspeaker;

wherein said at least one second loudspeaker is mounted on said at least one second adjustable loudspeaker base;

wherein said at least one second adjustable loudspeaker base is configured to be adjustable so as to adjust an angle of said at least one second loudspeaker, which adjusts said second negative output audio, such that said second negative output audio is configured to destructively interfere with said second ambient noise; and wherein said at least one second adjustable microphone base is configured to adjust an angle of said at least one second microphone to more accurately sense and measure said second ambient noise.

2. The noise cancelling system of claim 1, further comprising a second noise cancelling speaker, wherein said first and second noise cancelling speakers are physically connected to each other.

3. The noise cancelling system of claim 1, further comprising a second noise cancelling speaker, wherein said first and second noise cancelling speakers are physically separate units and are in wired communication with each other.

4. The noise cancelling system of claim 1, further comprising a second noise cancelling speaker, wherein said first and second noise cancelling speaker are physically separate units and are in wireless communication with each other.

5. The noise cancelling system of claim 1, further comprising a second noise cancelling speaker, wherein said first and second noise cancelling speakers are configured to be operatively connected to one or more structures selected from the group of structures consisting: a wall; a headboard; a stand; a floor; and a ceiling.

6. The noise cancelling system of claim 1, wherein said first ambient noise is experienced by a first user and is substantially reduced when said first ambient noise is destructively interfered with by said first negative audio output; and wherein said second ambient noise is experienced by a second user and is substantially reduced when said second ambient noise is destructively interfered with by a second negative audio output.

7. The noise cancelling system of claim 6, wherein said first and second ambient noises are substantially the same.

8. The noise cancelling system of claim 1, further comprising a second noise cancelling speaker, wherein said first and second noise cancelling speakers are configured to receive an audio signal from one or more media sources and play said audio signal via said first and second loudspeakers.

9. The noise cancelling system of claim 1, further comprising a second noise cancelling speaker, wherein said first and second noise cancelling speakers are configured to be controlled by a control interface.

10. The noise cancelling system of claim 1, further comprising at least one external microphone, which is configured to sense and measure an external ambient noise;

wherein said at least one external microphone is in communication with said first active noise cancelling module;

wherein said first active noise cancelling module processes said external ambient noise to create an external negative output audio;

wherein said external negative output audio is configured to be projected from said at least one first loudspeaker; and wherein said external negative output audio, when projected from said at least one first loudspeaker, destructively interferes with said external ambient noise.

11. A noise cancelling system, comprising:

a first noise cancelling speaker;

wherein said first noise cancelling speaker comprises: at least one first loudspeaker; at least one first microphone, which is configured to sense and measure a first ambient noise; a first active noise cancelling module, which is in communication with said at least one first loudspeaker and said at least one first microphone; at least one first adjustable loudspeaker base; and at least one first adjustable microphone base;

wherein said first active noise cancelling module is configured to process said first ambient noise to create a first negative output audio;

wherein said first negative output audio is configured to be projected from said at least one first loudspeaker; and wherein said first negative output audio, when projected from said at least one first loudspeaker, destructively interferes with said first ambient noise;

wherein said first noise cancelling speaker is configured to be operatively connected to one or more structures selected from the group of structures consisting: a wall; a headboard; a stand; a floor; and a ceiling;

wherein said at least one first loudspeaker is mounted on said at least one first adjustable loudspeaker base;

wherein said at least one first microphone is mounted on said at least one first adjustable microphone base;

wherein said at least one first adjustable loudspeaker base is configured to be adjustable so as to adjust an angle of said at least one first loudspeaker, thereby adjusting said first negative output audio, such that said first negative output audio is configured to destructively interfere with said first ambient noise; and wherein said at least one first adjustable microphone base is configured to adjust an angle of said at least one first microphone to improve sensing and measuring of said first ambient noise.

12. The noise cancelling system of claim 11, wherein said first ambient noise is experienced by a user and is substantially reduced when said first ambient noise is destructively interfered with by said first negative audio output.

13. The noise cancelling system of claim 12, wherein said first noise cancelling speaker is configured to receive an audio signal from one or more media sources and subsequently play the audio signal from said at least one first loudspeaker.

14. The noise cancelling system of claim 13, wherein said first noise cancelling speaker is configured to be controlled by a control interface.

15. The noise cancelling system of claim 14, further comprising at least one external microphone, which is configured to sense and measure an external ambient noise;

wherein said at least one external microphone is in communication with said first active noise cancelling module;

wherein said first active noise cancelling module is configured to process said external ambient noise to create an external negative output audio;

wherein said external negative output audio is configured to be projected from said at least one first loudspeaker; and wherein said external negative output audio, when projected from said at least one first loudspeaker, destructively interferes with said external ambient noise.

* * * * *